(12) United States Patent
Master et al.

(10) Patent No.: US 8,880,849 B2
(45) Date of Patent: *Nov. 4, 2014

(54) APPARATUS, METHOD, SYSTEM AND EXECUTABLE MODULE FOR CONFIGURATION AND OPERATION OF ADAPTIVE INTEGRATED CIRCUITRY HAVING FIXED, APPLICATION SPECIFIC COMPUTATIONAL ELEMENTS

(75) Inventors: Paul L. Master, Sunnyvale, CA (US);
Stephen J. Smith, Los Gatos, CA (US);
John Watson, Edgewood, WA (US)

(73) Assignee: Altera Corporation, San Jose, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 13/589,583

(22) Filed: Aug. 20, 2012

(65) Prior Publication Data
US 2012/0317397 A1  Dec. 13, 2012

Related U.S. Application Data

(63) Continuation of application No. 11/962,979, filed on Dec. 21, 2007, now Pat. No. 8,250,339, which is a continuation of application No. 11/241,009, filed on Sep. 30, 2005, now Pat. No. 7,320,062, which is a continuation of application No. 09/997,987, filed on Nov. 30, 2001, now Pat. No. 6,986,021.

(51) Int. Cl.
*G06F 13/00* (2006.01)
*G06F 15/78* (2006.01)

(52) U.S. Cl.
CPC .................................. *G06F 15/7867* (2013.01)
USPC .......................................................... 712/15

(58) Field of Classification Search
None
See application file for complete search history.

(56) References Cited

U.S. PATENT DOCUMENTS

| | | | |
|---|---|---|---|
| 3,409,175 | A | 11/1968 | Byrne |
| 3,666,143 | A | 5/1972 | Weston |
| 3,938,639 | A | 2/1976 | Birrell |
| 3,949,903 | A | 4/1976 | Benasutti et al. |
| 3,960,298 | A | 6/1976 | Birrell |
| 3,967,062 | A | 6/1976 | Dobias |
| 3,991,911 | A | 11/1976 | Shannon et al. |
| 3,995,441 | A | 12/1976 | McMillin |
| 4,076,145 | A | 2/1978 | Zygiel |

(Continued)

OTHER PUBLICATIONS

Hanna et al., "A Normalized Backpropagation Learning Algorithm for Multilayer Feed-Forward Neural Adaptive Filters," Neural Networks for Signal Processing XI, Proceedings of the 2001 IEEE Signal Processing Society Workshop pp. 63-72 (Sep. 2001).

*Primary Examiner* — William B Partridge
(74) *Attorney, Agent, or Firm* — Nixon Peabody LLP

(57) ABSTRACT

The present invention concerns configuration of a new category of integrated circuitry for adaptive computing. The various embodiments provide an executable information module for an adaptive computing engine (ACE) integrated circuit and may include configuration information, operand data, and may also include routing and power control information. The ACE IC comprises a plurality of heterogeneous computational elements coupled to an interconnection network. The plurality of heterogeneous computational elements include corresponding computational elements having fixed and differing architectures, such as fixed architectures for different functions such as memory, addition, multiplication, complex multiplication, subtraction, configuration, reconfiguration, control, input, output, and field programmability. In response to configuration information, the interconnection network is operative to configure the plurality of heterogeneous computational elements for a plurality of different functional modes.

17 Claims, 14 Drawing Sheets

(56) References Cited

U.S. PATENT DOCUMENTS

| | | | |
|---|---|---|---|
| 4,143,793 A | 3/1979 | McMillin et al. |
| 4,172,669 A | 10/1979 | Edelbach |
| 4,174,872 A | 11/1979 | Fessler |
| 4,181,242 A | 1/1980 | Zygiel et al. |
| RE30,301 E | 6/1980 | Zygiel |
| 4,218,014 A | 8/1980 | Tracy |
| 4,222,972 A | 9/1980 | Caldwell |
| 4,237,536 A | 12/1980 | Enelow et al. |
| 4,252,253 A | 2/1981 | Shannon |
| 4,302,775 A | 11/1981 | Widergren et al. |
| 4,333,587 A | 6/1982 | Fessler et al. |
| 4,354,613 A | 10/1982 | Desai et al. |
| 4,377,246 A | 3/1983 | McMillin et al. |
| 4,380,046 A | 4/1983 | Fung et al. |
| 4,393,468 A | 7/1983 | New |
| 4,413,752 A | 11/1983 | McMillin et al. |
| 4,458,584 A | 7/1984 | Annese et al. |
| 4,466,342 A | 8/1984 | Basile et al. |
| 4,475,448 A | 10/1984 | Shoaf et al. |
| 4,509,690 A | 4/1985 | Austin et al. |
| 4,520,950 A | 6/1985 | Jeans |
| 4,549,675 A | 10/1985 | Austin |
| 4,553,573 A | 11/1985 | McGarrah |
| 4,560,089 A | 12/1985 | McMillin et al. |
| 4,577,782 A | 3/1986 | Fessler |
| 4,578,799 A | 3/1986 | Scholl et al. |
| RE32,179 E | 6/1986 | Sedam et al. |
| 4,633,386 A | 12/1986 | Terepin et al. |
| 4,658,988 A | 4/1987 | Hassell |
| 4,694,416 A | 9/1987 | Wheeler et al. |
| 4,711,374 A | 12/1987 | Gaunt et al. |
| 4,713,755 A | 12/1987 | Worley, Jr. et al. |
| 4,719,056 A | 1/1988 | Scott |
| 4,726,494 A | 2/1988 | Scott |
| 4,747,516 A | 5/1988 | Baker |
| 4,748,585 A | 5/1988 | Chiarulli et al. |
| 4,758,985 A | 7/1988 | Carter |
| 4,760,525 A | 7/1988 | Webb |
| 4,760,544 A | 7/1988 | Lamb |
| 4,765,513 A | 8/1988 | McMillin et al. |
| 4,766,548 A | 8/1988 | Cedrone et al. |
| 4,781,309 A | 11/1988 | Vogel |
| 4,800,492 A | 1/1989 | Johnson et al. |
| 4,811,214 A | 3/1989 | Nosenchuck et al. |
| 4,824,075 A | 4/1989 | Holzboog |
| 4,827,426 A | 5/1989 | Patton et al. |
| 4,850,269 A | 7/1989 | Hancock et al. |
| 4,856,684 A | 8/1989 | Gerstung |
| 4,870,302 A | 9/1989 | Freeman |
| 4,901,887 A | 2/1990 | Burton |
| 4,905,231 A | 2/1990 | Leung et al. |
| 4,921,315 A | 5/1990 | Metcalfe et al. |
| 4,930,666 A | 6/1990 | Rudick |
| 4,932,564 A | 6/1990 | Austin et al. |
| 4,936,488 A | 6/1990 | Austin |
| 4,937,019 A | 6/1990 | Scott |
| 4,960,261 A | 10/1990 | Scott et al. |
| 4,961,533 A | 10/1990 | Teller et al. |
| 4,967,340 A | 10/1990 | Dawes |
| 4,974,643 A | 12/1990 | Bennett et al. |
| 4,982,876 A | 1/1991 | Scott |
| 4,993,604 A | 2/1991 | Gaunt et al. |
| 5,007,560 A | 4/1991 | Sassak |
| 5,021,947 A | 6/1991 | Campbell et al. |
| 5,040,106 A | 8/1991 | Maag |
| 5,044,171 A | 9/1991 | Farkas |
| 5,090,015 A | 2/1992 | Dabbish et al. |
| 5,099,418 A | 3/1992 | Pian et al. |
| 5,129,549 A | 7/1992 | Austin |
| 5,139,708 A | 8/1992 | Scott |
| 5,144,166 A | 9/1992 | Camarota et al. |
| 5,156,301 A | 10/1992 | Hassell et al. |
| 5,156,871 A | 10/1992 | Goulet et al. |
| 5,165,023 A | 11/1992 | Gifford |
| 5,165,575 A | 11/1992 | Scott |
| 5,190,083 A | 3/1993 | Gupta et al. |
| 5,190,189 A | 3/1993 | Zimmer et al. |
| 5,193,151 A | 3/1993 | Jain |
| 5,193,718 A | 3/1993 | Hassell et al. |
| 5,202,993 A | 4/1993 | Tarsy et al. |
| 5,203,474 A | 4/1993 | Haynes |
| 5,218,240 A | 6/1993 | Camarota et al. |
| 5,240,144 A | 8/1993 | Feldman |
| 5,245,227 A | 9/1993 | Furtek et al. |
| 5,261,099 A | 11/1993 | Bigo et al. |
| 5,263,509 A | 11/1993 | Cherry et al. |
| 5,269,442 A | 12/1993 | Vogel |
| 5,280,711 A | 1/1994 | Motta et al. |
| 5,297,400 A | 3/1994 | Benton et al. |
| 5,301,100 A | 4/1994 | Wagner |
| 5,303,846 A | 4/1994 | Shannon |
| 5,335,276 A | 8/1994 | Thompson et al. |
| 5,336,950 A | 8/1994 | Popli et al. |
| 5,339,428 A | 8/1994 | Burmeister et al. |
| 5,343,716 A | 9/1994 | Swanson et al. |
| 5,361,362 A | 11/1994 | Benkeser et al. |
| 5,368,198 A | 11/1994 | Goulet |
| 5,379,343 A | 1/1995 | Grube et al. |
| 5,381,546 A | 1/1995 | Servi et al. |
| 5,381,550 A | 1/1995 | Jourdenais et al. |
| 5,388,062 A | 2/1995 | Knutson |
| 5,388,212 A | 2/1995 | Grube et al. |
| 5,392,960 A | 2/1995 | Kendt et al. |
| 5,437,395 A | 8/1995 | Bull et al. |
| 5,450,557 A | 9/1995 | Kopp et al. |
| 5,454,406 A | 10/1995 | Rejret et al. |
| 5,465,368 A | 11/1995 | Davidson et al. |
| 5,475,856 A | 12/1995 | Kogge |
| 5,479,055 A | 12/1995 | Eccles |
| 5,490,165 A | 2/1996 | Blakeney, II et al. |
| 5,491,823 A | 2/1996 | Ruttenberg |
| 5,507,009 A | 4/1996 | Grube et al. |
| 5,515,519 A | 5/1996 | Yoshioka et al. |
| 5,517,600 A | 5/1996 | Shimokawa |
| 5,519,694 A | 5/1996 | Brewer et al. |
| 5,522,070 A | 5/1996 | Sumimoto |
| 5,530,964 A | 6/1996 | Alpert et al. |
| 5,534,796 A | 7/1996 | Edwards |
| 5,542,265 A | 8/1996 | Rutland |
| 5,553,755 A | 9/1996 | Bonewald et al. |
| 5,555,417 A | 9/1996 | Odnert et al. |
| 5,560,028 A | 9/1996 | Sachs et al. |
| 5,560,038 A | 9/1996 | Haddock |
| 5,570,587 A | 11/1996 | Kim |
| 5,572,572 A | 11/1996 | Kawan et al. |
| 5,590,353 A | 12/1996 | Sakakibara et al. |
| 5,594,657 A | 1/1997 | Cantone et al. |
| 5,600,810 A | 2/1997 | Ohkami |
| 5,600,844 A | 2/1997 | Shaw et al. |
| 5,602,833 A | 2/1997 | Zehavi |
| 5,603,043 A | 2/1997 | Taylor et al. |
| 5,607,083 A | 3/1997 | Vogel et al. |
| 5,608,643 A | 3/1997 | Wichter et al. |
| 5,611,867 A | 3/1997 | Cooper et al. |
| 5,623,545 A | 4/1997 | Childs et al. |
| 5,625,669 A | 4/1997 | McGregor et al. |
| 5,626,407 A | 5/1997 | Westcott |
| 5,630,206 A | 5/1997 | Urban et al. |
| 5,635,940 A | 6/1997 | Hickman et al. |
| 5,646,544 A | 7/1997 | Iadanza |
| 5,646,545 A | 7/1997 | Trimberger et al. |
| 5,647,512 A | 7/1997 | Assis Mascarenhas de Oliveira et al. |
| 5,667,110 A | 9/1997 | McCann et al. |
| 5,684,793 A | 11/1997 | Kiema et al. |
| 5,684,980 A | 11/1997 | Casselman |
| 5,687,236 A | 11/1997 | Moskowitz et al. |
| 5,694,613 A | 12/1997 | Suzuki |
| 5,694,794 A | 12/1997 | Jerg et al. |
| 5,699,328 A | 12/1997 | Ishizaki et al. |
| 5,701,398 A | 12/1997 | Glier et al. |
| 5,701,482 A | 12/1997 | Harrison et al. |
| 5,704,053 A | 12/1997 | Santhanam |
| 5,706,191 A | 1/1998 | Bassett et al. |

(56) References Cited

U.S. PATENT DOCUMENTS

| | | |
|---|---|---|
| 5,706,976 A | 1/1998 | Purkey |
| 5,712,996 A | 1/1998 | Schepers |
| 5,720,002 A | 2/1998 | Wang |
| 5,721,693 A | 2/1998 | Song |
| 5,721,854 A | 2/1998 | Ebcioglu et al. |
| 5,729,754 A | 3/1998 | Estes |
| 5,732,563 A | 3/1998 | Bethuy et al. |
| 5,734,808 A | 3/1998 | Takeda |
| 5,737,631 A | 4/1998 | Trimberger |
| 5,742,180 A | 4/1998 | DeHon et al. |
| 5,742,821 A | 4/1998 | Prasanna |
| 5,745,366 A | 4/1998 | Highma et al. |
| RE35,780 E | 5/1998 | Hassell et al. |
| 5,751,295 A | 5/1998 | Becklund et al. |
| 5,754,227 A | 5/1998 | Fukuoka |
| 5,758,261 A | 5/1998 | Weideman |
| 5,768,561 A | 6/1998 | Wise |
| 5,778,439 A | 7/1998 | Trimberger et al. |
| 5,784,636 A | 7/1998 | Rupp |
| 5,787,237 A | 7/1998 | Reilly |
| 5,790,817 A | 8/1998 | Asghar et al. |
| 5,791,517 A | 8/1998 | Avital |
| 5,791,523 A | 8/1998 | Oh |
| 5,794,062 A | 8/1998 | Baxter |
| 5,794,067 A | 8/1998 | Kadowaki |
| 5,802,055 A | 9/1998 | Krein et al. |
| 5,818,603 A | 10/1998 | Motoyama |
| 5,822,308 A | 10/1998 | Weigand et al. |
| 5,822,313 A | 10/1998 | Malek et al. |
| 5,822,360 A | 10/1998 | Lee et al. |
| 5,828,858 A | 10/1998 | Athanas et al. |
| 5,829,085 A | 11/1998 | Jerg et al. |
| 5,835,753 A | 11/1998 | Witt |
| 5,838,165 A | 11/1998 | Chatter |
| 5,845,815 A | 12/1998 | Vogel |
| 5,860,021 A | 1/1999 | Klingman |
| 5,862,961 A | 1/1999 | Motta et al. |
| 5,870,427 A | 2/1999 | Teidemann, Jr. et al. |
| 5,873,045 A | 2/1999 | Lee et al. |
| 5,881,106 A | 3/1999 | Cartier |
| 5,884,284 A | 3/1999 | Peters et al. |
| 5,886,537 A | 3/1999 | Macias et al. |
| 5,887,174 A | 3/1999 | Simons et al. |
| 5,889,816 A | 3/1999 | Agrawal et al. |
| 5,890,014 A | 3/1999 | Long |
| 5,892,900 A | 4/1999 | Ginter et al. |
| 5,892,961 A | 4/1999 | Trimberger |
| 5,892,962 A | 4/1999 | Cloutier |
| 5,894,473 A | 4/1999 | Dent |
| 5,901,884 A | 5/1999 | Goulet et al. |
| 5,903,886 A | 5/1999 | Heimlich et al. |
| 5,907,285 A | 5/1999 | Toms et al. |
| 5,907,580 A | 5/1999 | Cummings |
| 5,910,733 A | 6/1999 | Bertolet et al. |
| 5,912,572 A | 6/1999 | Graf, III |
| 5,913,172 A | 6/1999 | McCabe et al. |
| 5,917,852 A | 6/1999 | Butterfield et al. |
| 5,920,801 A | 7/1999 | Thomas et al. |
| 5,931,918 A | 8/1999 | Row et al. |
| 5,933,642 A | 8/1999 | Greenbaum et al. |
| 5,940,438 A | 8/1999 | Poon et al. |
| 5,949,415 A | 9/1999 | Lin et al. |
| 5,950,011 A | 9/1999 | Albrecht et al. |
| 5,950,131 A | 9/1999 | Vilmur |
| 5,951,674 A | 9/1999 | Moreno |
| 5,953,322 A | 9/1999 | Kimball |
| 5,956,518 A | 9/1999 | DeHon et al. |
| 5,956,967 A | 9/1999 | Kim |
| 5,959,811 A | 9/1999 | Richardson |
| 5,959,881 A | 9/1999 | Trimberger et al. |
| 5,963,048 A | 10/1999 | Harrison et al. |
| 5,966,534 A | 10/1999 | Cooke et al. |
| 5,970,254 A | 10/1999 | Cooke et al. |
| 5,987,105 A | 11/1999 | Jenkins et al. |
| 5,987,611 A | 11/1999 | Freund |
| 5,991,302 A | 11/1999 | Berl et al. |
| 5,991,308 A | 11/1999 | Fuhrmann et al. |
| 5,993,739 A | 11/1999 | Lyon |
| 5,999,734 A | 12/1999 | Willis et al. |
| 6,005,943 A | 12/1999 | Cohen et al. |
| 6,006,249 A | 12/1999 | Leong |
| 6,016,395 A | 1/2000 | Mohamed |
| 6,021,186 A | 2/2000 | Suzuki et al. |
| 6,021,492 A | 2/2000 | May |
| 6,023,742 A | 2/2000 | Ebeling et al. |
| 6,023,755 A | 2/2000 | Casselman |
| 6,028,610 A | 2/2000 | Deering |
| 6,036,166 A | 3/2000 | Olson |
| 6,039,219 A | 3/2000 | Bach et al. |
| 6,041,322 A | 3/2000 | Meng et al. |
| 6,041,970 A | 3/2000 | Vogel |
| 6,046,603 A | 4/2000 | New |
| 6,047,115 A | 4/2000 | Mohan et al. |
| 6,052,600 A | 4/2000 | Fette et al. |
| 6,055,314 A | 4/2000 | Spies et al. |
| 6,056,194 A | 5/2000 | Kolls |
| 6,059,840 A | 5/2000 | Click, Jr. |
| 6,061,580 A | 5/2000 | Altschul et al. |
| 6,073,132 A | 6/2000 | Gehman |
| 6,076,174 A | 6/2000 | Freund |
| 6,078,736 A | 6/2000 | Guccione |
| 6,085,740 A | 7/2000 | Ivri et al. |
| 6,088,043 A | 7/2000 | Kelleher et al. |
| 6,091,263 A | 7/2000 | New et al. |
| 6,091,765 A | 7/2000 | Pietzold, III et al. |
| 6,094,065 A | 7/2000 | Tavana et al. |
| 6,094,726 A | 7/2000 | Gonion et al. |
| 6,111,893 A | 8/2000 | Volftsun et al. |
| 6,111,935 A | 8/2000 | Hughes-Hartogs |
| 6,115,751 A | 9/2000 | Tam et al. |
| 6,119,178 A | 9/2000 | Martin et al. |
| 6,120,551 A | 9/2000 | Law et al. |
| 6,122,670 A | 9/2000 | Bennett et al. |
| 6,128,307 A | 10/2000 | Brown |
| 6,134,605 A | 10/2000 | Hudson et al. |
| 6,138,693 A | 10/2000 | Matz |
| 6,141,283 A | 10/2000 | Bogin et al. |
| 6,150,838 A | 11/2000 | Wittig et al. |
| 6,154,494 A | 11/2000 | Sugahara et al. |
| 6,157,997 A | 12/2000 | Oowaki et al. |
| 6,173,389 B1 | 1/2001 | Pechanek et al. |
| 6,175,854 B1 | 1/2001 | Bretscher |
| 6,175,892 B1 | 1/2001 | Sazzad et al. |
| 6,181,981 B1 | 1/2001 | Varga et al. |
| 6,185,418 B1 | 2/2001 | MacLellan et al. |
| 6,192,070 B1 | 2/2001 | Poon et al. |
| 6,192,255 B1 | 2/2001 | Lewis et al. |
| 6,192,388 B1 | 2/2001 | Cajolet |
| 6,195,788 B1 | 2/2001 | Leaver et al. |
| 6,198,924 B1 | 3/2001 | Ishii et al. |
| 6,199,181 B1 | 3/2001 | Rechef et al. |
| 6,202,130 B1 | 3/2001 | Scales, III et al. |
| 6,202,189 B1 | 3/2001 | Hinedi et al. |
| 6,219,697 B1 | 4/2001 | Lawande et al. |
| 6,219,756 B1 | 4/2001 | Kasamizugami |
| 6,219,780 B1 | 4/2001 | Lipasti |
| 6,223,222 B1 | 4/2001 | Fijolek et al. |
| 6,226,387 B1 | 5/2001 | Tewfik et al. |
| 6,230,307 B1 | 5/2001 | Davis et al. |
| 6,237,029 B1 | 5/2001 | Master et al. |
| 6,246,883 B1 | 6/2001 | Lee |
| 6,247,125 B1 | 6/2001 | Noel-Baron et al. |
| 6,249,251 B1 | 6/2001 | Chang et al. |
| 6,258,725 B1 | 7/2001 | Lee et al. |
| 6,263,057 B1 | 7/2001 | Silverman |
| 6,266,760 B1 | 7/2001 | DeHon et al. |
| 6,272,579 B1 | 8/2001 | Lentz et al. |
| 6,272,616 B1 | 8/2001 | Fernando et al. |
| 6,281,703 B1 | 8/2001 | Furuta et al. |
| 6,282,627 B1 | 8/2001 | Wong et al. |
| 6,289,375 B1 | 9/2001 | Knight et al. |
| 6,289,434 B1 | 9/2001 | Roy |
| 6,289,488 B1 | 9/2001 | Dave et al. |
| 6,292,822 B1 | 9/2001 | Hardwick |

(56) References Cited

U.S. PATENT DOCUMENTS

| | | |
|---|---|---|
| 6,292,827 B1 | 9/2001 | Raz |
| 6,292,830 B1 | 9/2001 | Taylor et al. |
| 6,301,653 B1 | 10/2001 | Mohamed et al. |
| 6,305,014 B1 | 10/2001 | Roediger et al. |
| 6,311,149 B1 | 10/2001 | Ryan et al. |
| 6,321,985 B1 | 11/2001 | Kolls |
| 6,326,806 B1 | 12/2001 | Fallside et al. |
| 6,346,824 B1 | 2/2002 | New |
| 6,347,346 B1 | 2/2002 | Taylor |
| 6,349,394 B1 | 2/2002 | Brock et al. |
| 6,353,841 B1 | 3/2002 | Marshall et al. |
| 6,356,994 B1 | 3/2002 | Barry et al. |
| 6,359,248 B1 | 3/2002 | Mardi |
| 6,360,256 B1 | 3/2002 | Lim |
| 6,360,259 B1 | 3/2002 | Bradley |
| 6,360,263 B1 | 3/2002 | Kurtzberg et al. |
| 6,363,411 B1 | 3/2002 | Dugan et al. |
| 6,366,999 B1 | 4/2002 | Drabenstott et al. |
| 6,377,983 B1 | 4/2002 | Cohen et al. |
| 6,378,072 B1 | 4/2002 | Collins et al. |
| 6,381,293 B1 | 4/2002 | Lee et al. |
| 6,381,735 B1 | 4/2002 | Hunt |
| 6,385,751 B1 | 5/2002 | Wolf |
| 6,405,214 B1 | 6/2002 | Meade, II |
| 6,408,039 B1 | 6/2002 | Ito |
| 6,410,941 B1 | 6/2002 | Taylor et al. |
| 6,411,612 B1 | 6/2002 | Halford et al. |
| 6,421,372 B1 | 7/2002 | Bierly et al. |
| 6,421,809 B1 | 7/2002 | Wuytack et al. |
| 6,426,649 B1 | 7/2002 | Fu et al. |
| 6,430,624 B1 | 8/2002 | Jamtgaard et al. |
| 6,433,578 B1 | 8/2002 | Wasson |
| 6,434,590 B1 | 8/2002 | Blelloch et al. |
| 6,438,737 B1 | 8/2002 | Morelli et al. |
| 6,456,996 B1 | 9/2002 | Crawford, Jr. et al. |
| 6,459,883 B2 | 10/2002 | Subramanian et al. |
| 6,467,009 B1 | 10/2002 | Winegarden et al. |
| 6,469,540 B2 | 10/2002 | Nakaya |
| 6,473,609 B1 | 10/2002 | Schwartz et al. |
| 6,483,343 B1 | 11/2002 | Faith et al. |
| 6,507,947 B1 | 1/2003 | Schreiber et al. |
| 6,510,138 B1 | 1/2003 | Pannell |
| 6,510,510 B1 | 1/2003 | Garde |
| 6,538,470 B1 | 3/2003 | Langhammer et al. |
| 6,556,044 B2 | 4/2003 | Langhammer et al. |
| 6,563,891 B1 | 5/2003 | Eriksson et al. |
| 6,570,877 B1 | 5/2003 | Kloth et al. |
| 6,577,678 B2 | 6/2003 | Scheuermann |
| 6,587,684 B1 | 7/2003 | Hsu et al. |
| 6,590,415 B2 | 7/2003 | Agrawal et al. |
| 6,601,086 B1 | 7/2003 | Howard et al. |
| 6,601,158 B1 | 7/2003 | Abbott et al. |
| 6,604,085 B1 | 8/2003 | Kolls |
| 6,604,189 B1 | 8/2003 | Zemlyak et al. |
| 6,606,529 B1 | 8/2003 | Crowder, Jr. et al. |
| 6,615,333 B1 | 9/2003 | Hoogerbrugge et al. |
| 6,618,434 B2 | 9/2003 | Heidari-Bateni et al. |
| 6,640,304 B2 | 10/2003 | Ginter et al. |
| 6,647,429 B1 | 11/2003 | Semal |
| 6,653,859 B2 | 11/2003 | Sihlbom et al. |
| 6,675,265 B2 | 1/2004 | Barroso et al. |
| 6,675,284 B1 | 1/2004 | Warren |
| 6,691,148 B1 | 2/2004 | Zinky et al. |
| 6,694,380 B1 | 2/2004 | Wolrich et al. |
| 6,711,617 B1 | 3/2004 | Bantz et al. |
| 6,718,182 B1 | 4/2004 | Kung |
| 6,721,286 B1 | 4/2004 | Williams et al. |
| 6,721,884 B1 | 4/2004 | De Oliveira Kastrup Pereira et al. |
| 6,732,354 B2 | 5/2004 | Ebeling et al. |
| 6,735,621 B1 | 5/2004 | Yoakum et al. |
| 6,738,744 B2 | 5/2004 | Kirovski et al. |
| 6,748,360 B2 | 6/2004 | Pitman et al. |
| 6,751,723 B1 | 6/2004 | Kundu et al. |
| 6,754,470 B2 | 6/2004 | Hendrickson et al. |
| 6,760,587 B2 | 7/2004 | Holtzman et al. |
| 6,760,833 B1 | 7/2004 | Dowling |
| 6,766,165 B2 | 7/2004 | Sharma et al. |
| 6,778,212 B1 | 8/2004 | Deng et al. |
| 6,785,341 B2 | 8/2004 | Walton et al. |
| 6,819,140 B2 | 11/2004 | Yamanaka et al. |
| 6,823,448 B2 | 11/2004 | Roth et al. |
| 6,829,633 B2 | 12/2004 | Gelfer et al. |
| 6,832,250 B1 | 12/2004 | Coons et al. |
| 6,836,839 B2 | 12/2004 | Master et al. |
| 6,859,434 B2 | 2/2005 | Segal et al. |
| 6,865,664 B2 | 3/2005 | Budrovic et al. |
| 6,871,236 B2 | 3/2005 | Fishman et al. |
| 6,883,084 B1 | 4/2005 | Donohoe |
| 6,894,996 B2 | 5/2005 | Lee |
| 6,901,440 B1 | 5/2005 | Bimm et al. |
| 6,912,515 B2 | 6/2005 | Jackson et al. |
| 6,941,336 B1 | 9/2005 | Mar |
| 6,980,515 B1 | 12/2005 | Schunk et al. |
| 6,985,517 B2 | 1/2006 | Matsumoto et al. |
| 6,986,021 B2 | 1/2006 | Master et al. |
| 6,986,142 B1 | 1/2006 | Ehlig et al. |
| 6,988,139 B1 | 1/2006 | Jervis et al. |
| 7,032,229 B1 | 4/2006 | Flores et al. |
| 7,044,741 B2 | 5/2006 | Leem |
| 7,082,456 B2 | 7/2006 | Mani-Meitav et al. |
| 7,139,910 B1 | 11/2006 | Ainsworth et al. |
| 7,142,731 B1 | 11/2006 | Toi |
| 7,151,925 B2 | 12/2006 | Ting et al. |
| 7,249,242 B2 | 7/2007 | Ramchandran |
| 7,302,062 B2 | 11/2007 | Christoph |
| 2001/0003191 A1 | 6/2001 | Kovacs et al. |
| 2001/0023482 A1 | 9/2001 | Wray |
| 2001/0029515 A1 | 10/2001 | Mirsky |
| 2001/0034795 A1 | 10/2001 | Moulton et al. |
| 2001/0039654 A1 | 11/2001 | Miyamoto |
| 2001/0048713 A1 | 12/2001 | Medlock et al. |
| 2001/0048714 A1 | 12/2001 | Jha |
| 2001/0050948 A1 | 12/2001 | Ramberg et al. |
| 2002/0010848 A1 | 1/2002 | Kamano et al. |
| 2002/0013799 A1 | 1/2002 | Blaker |
| 2002/0013937 A1 | 1/2002 | Ostanevich et al. |
| 2002/0015435 A1 | 2/2002 | Rieken |
| 2002/0015439 A1 | 2/2002 | Kohli et al. |
| 2002/0023210 A1 | 2/2002 | Tuomenoksa et al. |
| 2002/0024942 A1 | 2/2002 | Tsuneki et al. |
| 2002/0024993 A1 | 2/2002 | Subramanian et al. |
| 2002/0031166 A1 | 3/2002 | Subramanian et al. |
| 2002/0032551 A1 | 3/2002 | Zakiya |
| 2002/0035623 A1 | 3/2002 | Lawande et al. |
| 2002/0041581 A1 | 4/2002 | Aramaki |
| 2002/0042907 A1 | 4/2002 | Yamanaka et al. |
| 2002/0061741 A1 | 5/2002 | Leung et al. |
| 2002/0069282 A1 | 6/2002 | Reisman |
| 2002/0072830 A1 | 6/2002 | Hunt |
| 2002/0078337 A1 | 6/2002 | Moreau et al. |
| 2002/0083305 A1 | 6/2002 | Renard et al. |
| 2002/0083423 A1 | 6/2002 | Ostanevich et al. |
| 2002/0087829 A1 | 7/2002 | Snyder et al. |
| 2002/0089348 A1 | 7/2002 | Langhammer |
| 2002/0101909 A1 | 8/2002 | Chen et al. |
| 2002/0107905 A1 | 8/2002 | Roe et al. |
| 2002/0107962 A1 | 8/2002 | Richter et al. |
| 2002/0119803 A1 | 8/2002 | Bitterlich et al. |
| 2002/0120672 A1 | 8/2002 | Butt et al. |
| 2002/0133688 A1 | 9/2002 | Lee et al. |
| 2002/0138716 A1 | 9/2002 | Master et al. |
| 2002/0141489 A1 | 10/2002 | Imaizumi |
| 2002/0147845 A1 | 10/2002 | Sanchez-Herrero et al. |
| 2002/0159503 A1 | 10/2002 | Ramachandran |
| 2002/0162026 A1 | 10/2002 | Neuman et al. |
| 2002/0168018 A1 | 11/2002 | Scheuermann |
| 2002/0181559 A1 | 12/2002 | Heidari-Bateni et al. |
| 2002/0184275 A1 | 12/2002 | Dutta et al. |
| 2002/0184291 A1 | 12/2002 | Hogenauer |
| 2002/0184498 A1 | 12/2002 | Qi |
| 2002/0191790 A1 | 12/2002 | Anand et al. |
| 2003/0007606 A1 | 1/2003 | Suder et al. |
| 2003/0012270 A1 | 1/2003 | Zhou et al. |
| 2003/0018446 A1 | 1/2003 | Makowski et al. |

(56) References Cited

U.S. PATENT DOCUMENTS

| | | |
|---|---|---|
| 2003/0018700 A1 | 1/2003 | Giroti et al. |
| 2003/0023830 A1 | 1/2003 | Hogenauer |
| 2003/0026242 A1 | 2/2003 | Jokinen et al. |
| 2003/0030004 A1 | 2/2003 | Dixon et al. |
| 2003/0046421 A1 | 3/2003 | Horvitz et al. |
| 2003/0061260 A1 | 3/2003 | Rajkumar |
| 2003/0061311 A1 | 3/2003 | Lo |
| 2003/0063656 A1 | 4/2003 | Rao et al. |
| 2003/0074473 A1 | 4/2003 | Pham et al. |
| 2003/0076815 A1 | 4/2003 | Miller et al. |
| 2003/0099223 A1 | 5/2003 | Chang et al. |
| 2003/0102889 A1 | 6/2003 | Master et al. |
| 2003/0105949 A1 | 6/2003 | Master et al. |
| 2003/0110485 A1 | 6/2003 | Lu et al. |
| 2003/0142818 A1 | 7/2003 | Raghunathan et al. |
| 2003/0154357 A1 | 8/2003 | Master et al. |
| 2003/0163723 A1 | 8/2003 | Kozuch et al. |
| 2003/0172138 A1 | 9/2003 | McCormack et al. |
| 2003/0172139 A1 | 9/2003 | Srinivasan et al. |
| 2003/0200538 A1 | 10/2003 | Ebeling et al. |
| 2003/0212684 A1 | 11/2003 | Meyer et al. |
| 2003/0229864 A1 | 12/2003 | Watkins |
| 2004/0006584 A1 | 1/2004 | Vandeweerd |
| 2004/0010645 A1 | 1/2004 | Scheuermann et al. |
| 2004/0015970 A1 | 1/2004 | Scheuermann |
| 2004/0025159 A1 | 2/2004 | Scheuermann et al. |
| 2004/0057505 A1 | 3/2004 | Valio |
| 2004/0062300 A1 | 4/2004 | McDonough et al. |
| 2004/0081248 A1 | 4/2004 | Parolari |
| 2004/0093479 A1 | 5/2004 | Ramchandran |
| 2004/0168044 A1 | 8/2004 | Ramchandran |
| 2005/0044344 A1 | 2/2005 | Stevens |
| 2005/0166038 A1 | 7/2005 | Wang et al. |
| 2005/0198199 A1 | 9/2005 | Dowling |
| 2006/0031660 A1 | 2/2006 | Master et al. |

ADAPTIVE COMPUTING ENGINE (ACE)

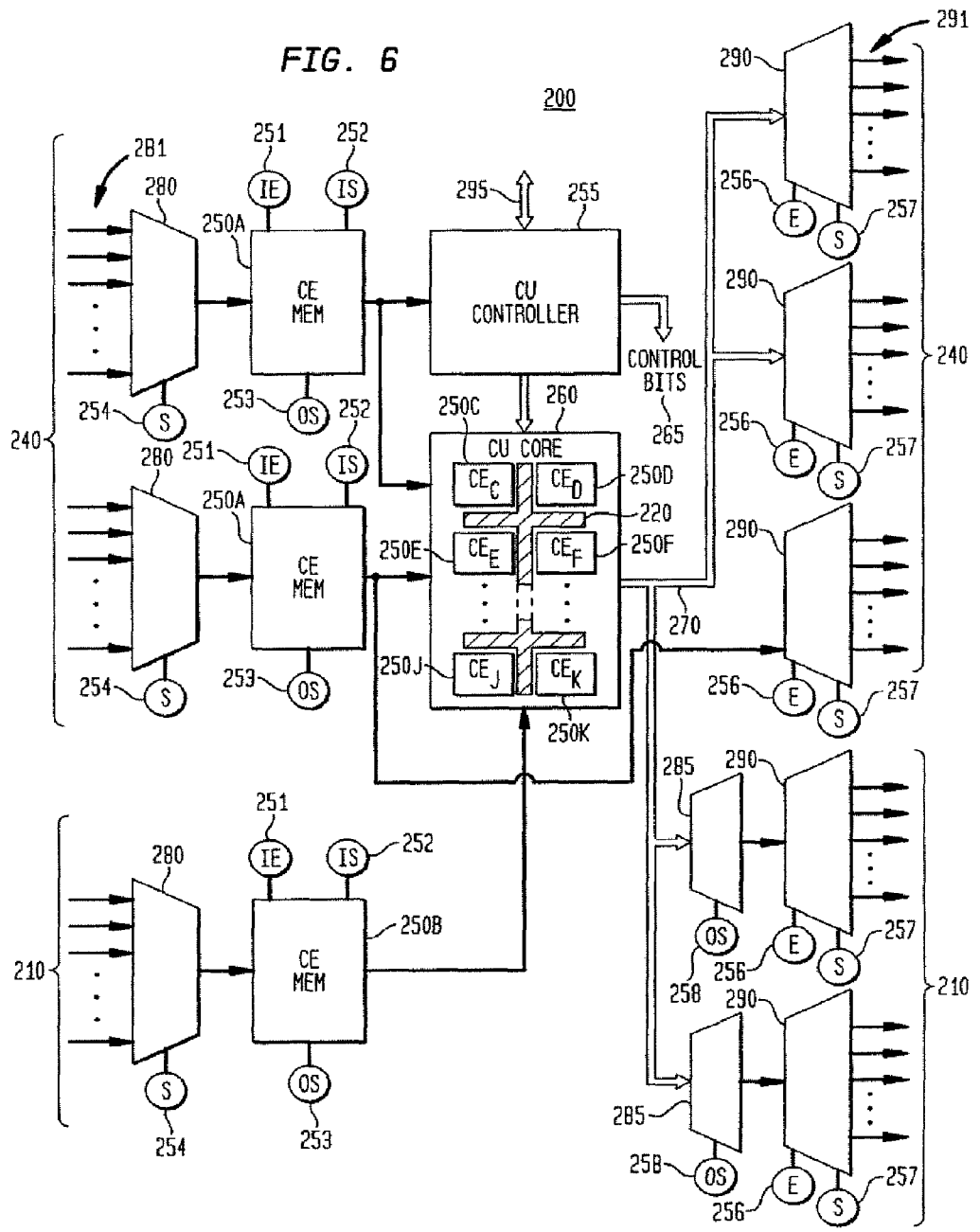

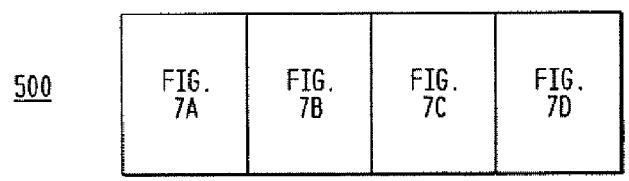
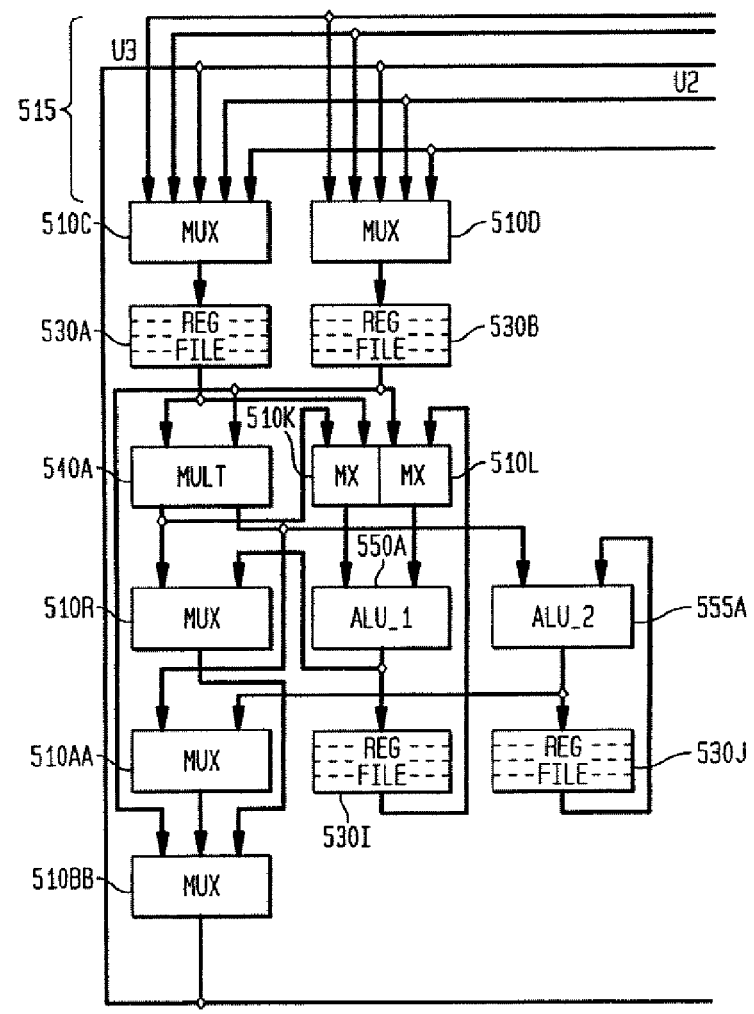

APPARATUS, METHOD, SYSTEM AND EXECUTABLE MODULE FOR CONFIGURATION AND OPERATION OF ADAPTIVE INTEGRATED CIRCUITRY HAVING FIXED, APPLICATION SPECIFIC COMPUTATIONAL ELEMENTS

CROSS-REFERENCE TO RELATED APPLICATIONS

This application is a continuation of and claims priority to U.S. patent application Ser. No. 11/962,979, filed Dec. 21, 2007, now U.S. Pat. No. 8,250,339, which is a continuation of U.S. patent application Ser. No. 11/241,009, filed Sep. 30, 2005, now U.S. Pat. No. 7,320,062, which is a continuation of U.S. patent application Ser. No. 09/997,987, filed Nov. 30, 2001, now U.S. Pat. No. 6,986,021, all of which are incorporated by reference herein, commonly assigned herewith, and with priority claimed for all commonly disclosed subject matter (the "parent application").

This application is related to Paul L. Master et al., U.S. Pat. No. 6,836,839 B2, issued Dec. 28, 2004, entitled "Adaptive Integrated Circuitry With Heterogeneous And Reconfigurable Matrices Of Diverse And Adaptive Computational Units Having Fixed, Application Specific Computational Elements", filed Mar. 22, 2001, incorporated by reference herein, commonly assigned herewith, and with priority claimed for all commonly disclosed subject matter (the "first related application").

This application is related to Paul L. Master et al., U.S. patent application Ser. No. 09/997,530, entitled "Apparatus, System And Method For Configuration Of Adaptive Integrated Circuitry Having Fixed, Application Specific Computational Elements", filed Nov. 30, 2001, incorporated by reference herein, commonly assigned herewith, and with priority claimed for all commonly disclosed subject matter (the "second related application").

FIELD OF THE INVENTION

The present invention relates, in general, to integrated circuits and systems of integrated circuits. More particularly, the present invention relates to an apparatus, method, system and executable module for configuration and operation of adaptive integrated circuitry having fixed, application specific computational elements.

BACKGROUND OF THE INVENTION

The first related application discloses a new form or type of integrated circuitry which effectively and efficiently combines and maximizes the various advantages of processors, application specific integrated circuits ("ASICs"), and field programmable gate arrays ("FPGAs"), while minimizing potential disadvantages. The first related application illustrates a new form or type of integrated circuit, referred to as an adaptive computing engine ("ACE"), which provides the programming flexibility of a processor, the post-fabrication flexibility of FPGAs, and the high speed and high utilization factors of an ASIC. This ACE integrated circuitry is readily reconfigurable, is capable of having corresponding, multiple modes of operation, and further minimizes power consumption while increasing performance, with particular suitability for low power applications, such as for use in hand-held and other battery-powered devices.

The second related application discloses a preferred system embodiment that includes an ACE integrated circuit coupled with one or more sets of configuration information. This configuration information is required to generate, in advance or in real-time (or potentially at a slower rate), the configurations and reconfigurations which provide and create one or more operating modes for the ACE circuit, such as wireless communication, radio reception, personal digital assistance ("PDA"), MP3 or MP4 music playing, or any other desired functions. Various methods, apparatuses and systems are also illustrated in the second related application for generating and providing configuration information for an ACE integrated circuit, for determining ACE reconfiguration capacity or capability, for providing secure and authorized configurations, and for providing appropriate monitoring of configuration and content usage.

A need remains, however, for an apparatus, method and system for not only configuring, but also operating such adaptive integrated circuitry, with one or more operating modes or other functionality of ACE circuitry and other ACE devices. Such an apparatus, method and system should be capable of configuring and operating the adaptive IC, utilizing both configuration information provided independently of user data or other content, and utilizing configuration information provided concurrently with user data or other content. Such an apparatus, method and system should provide the means to, among other things, coordinate configuration with data, provide self-routing of configuration and data, and provide power control within ACE circuitry.

SUMMARY OF THE INVENTION

The adaptive computing engine ("ACE") circuit of the present invention, for adaptive or reconfigurable computing, includes a plurality of heterogeneous computational elements coupled to an interconnection network (rather than the same, homogeneous repeating and arrayed units of FPGAs). The plurality of heterogeneous computational elements include corresponding computational elements having fixed and differing architectures, such as fixed architectures for different functions such as memory, addition, multiplication, complex multiplication, subtraction, configuration, reconfiguration, control, input, output, routing, and field programmability.

In response to configuration information, the interconnection network is operative, in advance, in real-time or potentially slower, to configure and reconfigure the plurality of heterogeneous computational elements for a plurality of different functional modes, including linear algorithmic operations, non-linear algorithmic operations, finite state machine operations, memory operations, and bit-level manipulations. In turn, this configuration and reconfiguration of heterogeneous computational elements, forming various computational units and adaptive matrices, generates the selected, higher-level operating mode of the ACE integrated circuit, for the performance of a wide variety of tasks.

The present invention illustrates various means for both configuring and operating such adaptive integrated circuitry, for one or more operating modes or other functionality of ACE circuitry and other ACE devices. The present invention provides such configuration and operation of the adaptive IC, utilizing both configuration information provided independently of user data or other content, and utilizing configuration information provided concurrently with user data or other content. The present invention also provides the means to, among other things, coordinate configuration with data, provide self-routing of configuration and data, and provide power control within ACE circuitry.

A preferred method of providing such configuration and operation utilizes a "silverware" module (also referred to as "silverware") comprised of a plurality of information sequences. A first information sequence (or field) provides configuration control, which may be either configuration information or a reference (such as a flag or other designation) to corresponding configuration information cached or stored in memory (or stored in a configuration of computational elements). A second information sequence provides operand data for use by configured computational elements. A third information sequence provides routing control, to direct the other information sequences to their appropriate locations within the matrix environment of the ACE integrated circuitry. Also in the preferred embodiment a fourth information sequence is utilized to provide power control, to clock on or off various computational elements. Other information sequences may also be utilized, for example, to maintain configuration instantiations for repeated use, or to define new fields or types of information for future use (which are currently undefined).

For example, one of the preferred system embodiments provides, first, means for routing configuration information to a plurality of computational elements; second, means for configuring and reconfiguring a plurality of computational elements to form a plurality of configured computational elements for the performance of a plurality of selected functions; third, means for providing operand data to the plurality of configured computational elements; and fourth, means for controlling configuration timing to precede a receipt of corresponding operand data.

Another preferred system embodiment provides, first, means for spatially configuring and reconfiguring a plurality of computational elements to form a first plurality of configured computational elements for the performance of a first plurality of selected functions; second, means for temporally configuring the plurality of computational elements to form a second plurality of configured computational elements for the performance of a second plurality of selected functions; third, means for providing data to the first and second pluralities of configured computational elements; and fourth, means for coordinating the spatial and temporal configurations of the plurality of computational elements with the provision of the data to the first and second pluralities of configured computational elements.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 6 is a block diagram illustrating, in greater detail, a computational unit of a reconfigurable matrix in accordance with the present invention.

FIGS. 7A-7D are a block diagram illustrating, in detail, a preferred multi-function adaptive computational unit having a plurality of different, fixed computational elements, in accordance with the present invention.

DETAILED DESCRIPTION OF THE INVENTION

Figure 1:
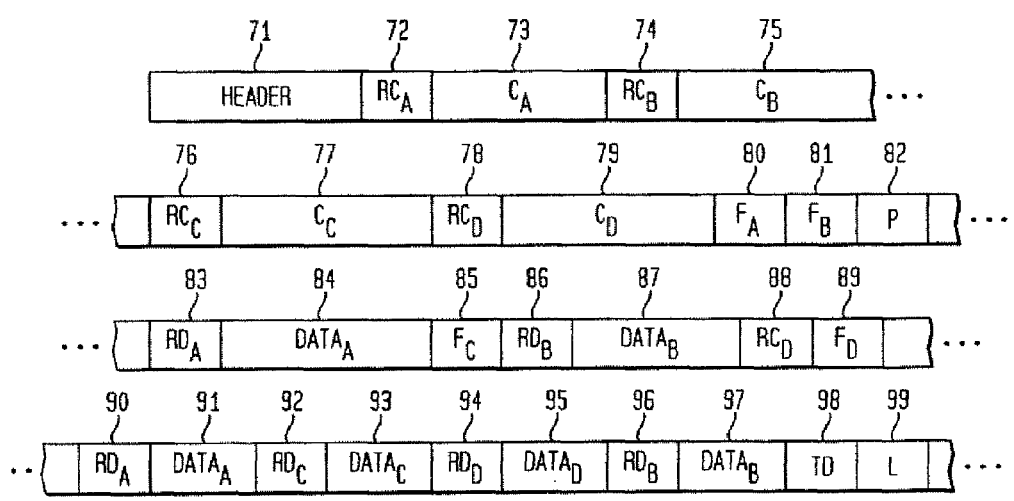
FIG. 1 is a diagram illustrating an exemplary executable information module in accordance with the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As indicated above, a need remains for an apparatus, method and system for configuring and operating adaptive integrated circuitry, to provide one or more operating modes of ACE circuitry and other devices incorporating ACE technology. Such an apparatus, method and system are provided in accordance with the present invention, and are capable of configuring and operating the adaptive IC, utilizing both configuration information provided independently of user data or other content, and utilizing configuration information provided concurrently with user data or other content. The present invention also provides the means to, among other things, coordinate configuration with data, provide self-routing of configuration and data, and provide power control within ACE circuitry.

The apparatus, systems and methods of the present invention utilize a new form of integrated circuitry, referred to as an adaptive computing engine. The ACE architecture utilizes a plurality of fixed computational elements, such as correlators, multipliers, complex multipliers, adders, routers, demodulators, and combiners, which may be configured and reconfigured, in advance, in real-time or potentially at a slower rate, through an interconnection network, in response to configuration information, to form the functional blocks (computational units and matrices) which may be needed, at any given time, to execute or perform the selected operating mode, such as to perform wireless communication functionality. The methodology and systems of the present invention also minimize power consumption and are especially suitable for low power applications, such as for use in hand-held and other battery-powered devices.

FIG. 1 is a diagram illustrating an exemplary executable information module 70, preferably referred to as a "silverware module", in accordance with the present invention. The module 70 may be implemented as one or more discrete information packets, such as internet protocol (IP) packets, or may be implemented as a continuous stream of information or other bit stream, as discussed in greater detail below.

Referring to FIG. 1, the module 70 consists of a plurality of information fields, some of which are requisite and some of which are optional. In addition, depending upon the chosen embodiment, the various fields (71-99) may occur in a plurality of different orders, and in some embodiments, without regard to order. As illustrated in FIG. 1, the module 70 includes header information in field 71, such as synchronization, addressing, and security information (such as digital signatures). Such header information is typically included when the module 70 is transmitted or transferred to an ACE circuit from an external source, such as those illustrated in FIG. 2.

Next, fields 72-78 illustrate configuration information with corresponding self-routing information. As discussed in greater detail below, this routing information has two purposes: first, it directs the configuration information to a cache or memory location for storage within the various matrices of the ACE architecture, and second, it directs the configuration information to its designated or specified location to configure computational elements within the various matrices of the ACE architecture. (It should be noted that once configured, the computational elements and interconnection network effectively also operate as a memory, storing the configuration information as the actual configuration.) The routing information may be provided to the ACE by an external source or may be self-generated by the ACE architecture. As illustrated in FIG. 1, fields 72 and 73 provide routing information for configuration "A" and configuration information for configuration "A", respectively; fields 74 and 75 provide routing information for configuration "B" and configuration information for configuration "B", respectively; fields 76 and 77 provide routing information for configuration "C" and configuration information for configuration "C", respectively; and fields 78 and 79 provide routing information for configuration "D" and configuration information for configuration "D", respectively.

Such routing and configuration information, in the preferred embodiment, are provided for all configurations to be utilized in providing one or more operating modes for ACE circuits and devices. As illustrated below, there are many instances in which only configuration information is provided to an ACE device, which may then internally generate its own routing information. In other cases, both types of information may be provided to an ACE from an external source. Following such configuration, for example, as a mobile communication device, user data may be provided separately, such as voice data during a mobile communication session.

In yet other cases, such configuration and routing information may be provided concurrently with user data. For example, an MPEG file may be downloaded to an ACE device, consisting of both configuration information and the music content to be played. For these circumstances, and for the internal operation of the ACE architecture as discussed in greater detail below, additional information is included in the module 70. Referring to FIG. 1, the module 70 preferably includes references or flags to indicate previously provided and stored configuration information, such as field 80, providing a reference or flag to configuration information "A" and field 81, providing a reference or flag to configuration information "B". These references or flags are used to coordinate the timing of configurations with respect to arriving data, i.e., to "call", initiate or otherwise direct the occurrence of these configurations prior to a receipt of data by these configured computational elements. Next, as illustrated, the module 70 (optionally) includes a power control field 82, which is utilized to separately and independently clock (or power) the various components of the ACE architecture, for example, to provide clocking to configurations "A" and "B", while saving power in then currently unused portions of the IC.

Continuing to refer to FIG. 1, fields 83-97, among other things, illustrate the provision of user data to the ACE architecture, namely, the data to be utilized, operated upon or "crunched" by the various configured computational elements in performing their various functions ("user data" or "operand data"), such as discrete cosine transformation, and may also include other data or parameters useful in establishing or restoring settings of the various computational elements, such as previously derived equalizer coefficients ("coefficient data"). (Such operand or user data, as used to herein, provides a "shorthand" distinction among types of information, distinguishing data to be "crunched" from configuration information, configuration data, or other types of information, such as routing and clocking information.) Routing information is also utilized to provide self-routing of the data to their appropriate matrix locations. In addition, an optional field may be included to designate types of information, such as configuration information or data information.

As illustrated, fields 83 and 84 provide routing information for the data for configuration "A" and the data to be used in or by configuration "A", respectively; field 85 provides a reference or flag to generate configuration "C"; fields 86 and 87 provide routing information for the data for configuration "B" and the data to be used in or by configuration "B", respectively; field 88 provides a second or substitute routing location for configuration "D" (such as a different location within the various matrices), and field 89 provides a reference or flag to generate configuration "D"; fields 90 and 91 provide routing information for the data for configuration "A" and additional data to be used in or by configuration "A", respectively; fields 92 and 93 provide routing information for the data for configuration "C" and the data to be used in or by configuration "C", respectively; fields 94 and 95 provide routing information for the data for configuration "D" and the data to be used in or by configuration "D", respectively; and fields 96 and 97 provide routing information for the data for configuration "B" and the data to be used in or by configuration "B", respectively. Another field (98) may be used to provide information concerning or designating an information type (for example, that configuration information will be the next fields in the module 70). As another option, an additional field (field 99) may also be utilized for "loop" instructions, to indicate that a particular instantiation of a configuration is to remain in place for a particular duration or number of cycles. Other fields may also be utilized, for example, to define new types of information for future use (which are currently undefined), or otherwise to be self-extensible. As illustrated, the module 70 may continue, providing more configuration information and data (with corresponding routing information, power control, type designations, and so on), for as long as the ACE architecture is being utilized or operated. The use of the information provided in module 70 is also discussed in greater detail below.

Figure 2:
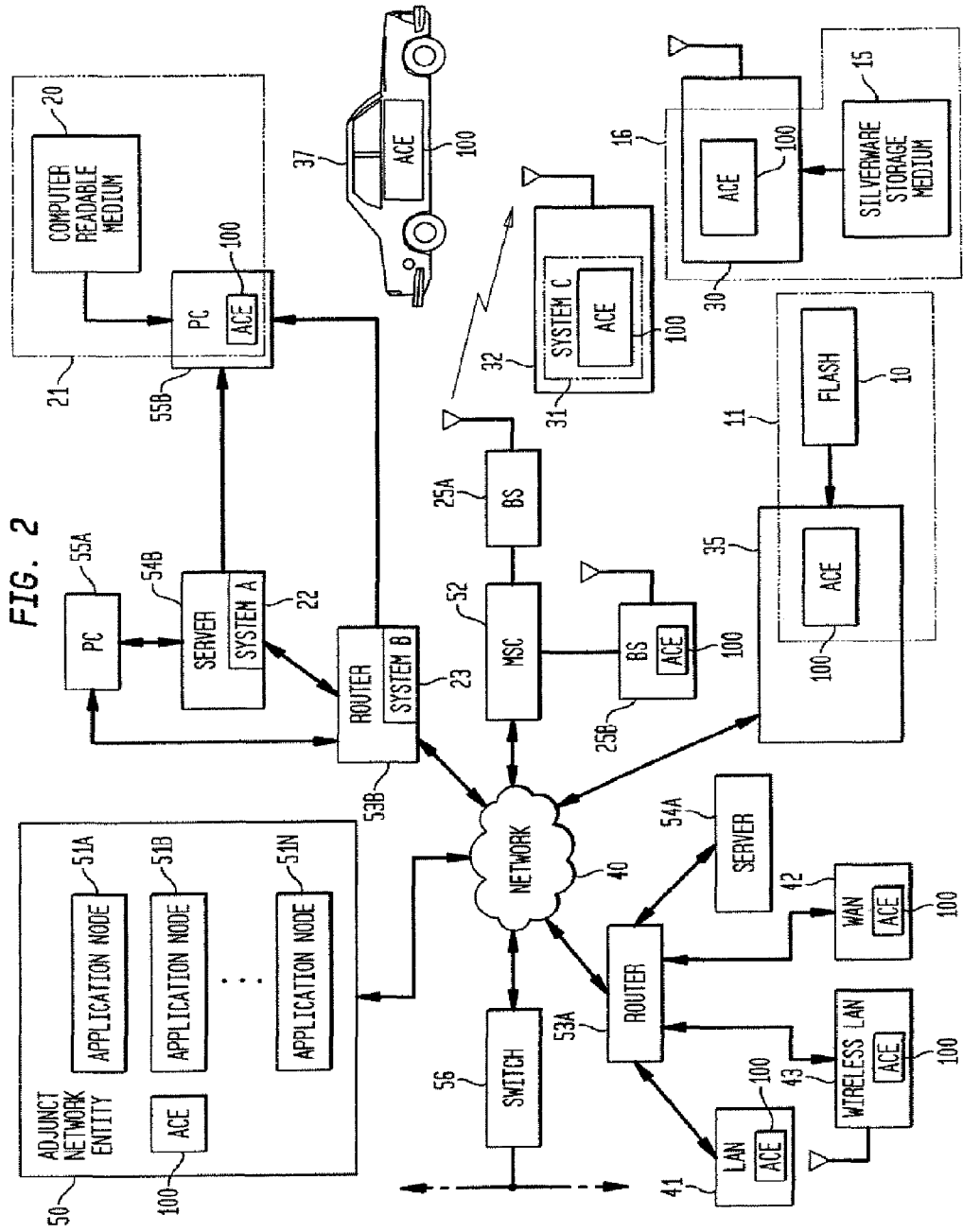
FIG. 2 is a block diagram illustrating a plurality of system embodiments in accordance with the present invention.

FIG. 2 is a block diagram illustrating a plurality of system embodiments in accordance with the present invention. As indicated above, and as discussed in greater detail below, the preferred system of the present invention consists of an ACE 100 coupled or combined with configuration information (such as a module 70), and may be implemented in a wide variety of embodiments including, for example, within wireless devices 30 and 32, wireline device 35, computers 55, consumer electronics, automobile electronics 37, and network infrastructure equipment, such as servers 54, routers 53, local area network (LAN) 41, wireless LAN 43, wide area network (WAN) 42, adjunct network entity 50, switching systems 52 and 56, wireless base stations 25, and any other electronic device.

As a point of clarification, the terminology "configuration information", as used herein, should be understood generally to have and include its linguistic, plural connotation, i.e., configuration information is a plurality of information bits, groups or sets of information, namely, a "plurality" of configuration information. For example, "configuration information" may be viewed as being a set of configuration information comprised of a plurality of subsets, such subsets being first configuration information, second configuration information, third configuration information, and so on, through $n^{th}$ configuration information. Although a subset of configuration information may be singular (one bit of information contained in the subset), each such subset of configuration information is also generally plural, typically including more information than may be encoded by a single bit, such as 8, 16, 32 or 64 information bits.

Configuration information, such as that illustrated in module 70, with or without user or coefficient data, may also exist in a variety of forms, and at any given time, may have a stored (or fixed) nature, or may have a transient or temporal nature. For example, as illustrated in FIG. 2, executable modules (such as module 70), or other configuration information (without the form of module 70), may be stored as a binary (bit) file in a flash memory 10 (for device 35) or in a computer or other machine-readable medium 20 (such as a CD-ROM, other optical drive, computer memory, hard drive or floppy disk) for computer 55B. As discussed in greater detail below, such configuration information may also be interdigitated or intertwined with data, forming a silverware module such as module 70, and also stored as a binary (bit) file in a silverware storage media 15 or other medium (such as flash memory or CD-ROM). The module 70 or configuration information may also occur transiently and across time, for example, when wirelessly downloaded from a base station 25A to a wireless device 32 (such as a mobile station or other mobile telephone) over an air interface.

Referring to FIG. 2 in greater detail, a plurality of networks are illustrated, including local area network ("LAN") 41, wireless LAN 43, wide area network ("WAN") 42, and, more generally, network 40, such as a public switched telephone network ("PSTN") or internet. Coupled to the various networks are routers 53A and 53B, servers 54A and 54B, wireline switching center 56, mobile switching center ("MSC") 52, with further connection or culpability to wireless base stations (or other wireless transceivers) 25A and 25B, wireline device 35, computers 55A and 55B, and adjunct network entity 50. As known in the art, these various devices may be connected via trenching, optical and other signaling lines to each other and to broader networks (such as to a PSTN or internet), with multiple communication connections to other locations, such as providing a link to a satellite (not separately illustrated) and providing other wireless links (air interfaces). Router 53B, server 54B, base station 25B, and computer 55B are separately designated (with "B") to illustrate the potential inclusion of an ACE 100 (and the systems of the present invention) within such infrastructure equipment, and within local area network (LAN) 41, wireless LAN 43, wide area network (WAN) 42, adjunct network entity 50, in addition to inclusion within consumer, automotive, and mobile electronics. Also, while the wireline and mobile switching centers 56 and 52 are usually physically separated due to regulatory and other historical or legacy reasons, these switching centers may also be combined into one or more switching centers having both wireline and wireless functionalities.

These various server, switching, routing and other entities may also be connected through network 40 to one or more intelligent network devices referred to as an adjunct network entities, such as adjunct network entity 50, which may be an additional type of server, database, a service control point ("SCP"), a service circuit node ("SCN") (also referred to as a service node), an intelligent peripheral ("IP"), a gateway, or another intelligent network device. One or more adjunct network entities 50 are preferably connected or coupled to a network 40, for direct or indirect connection to wireline switching center 56, MSC 52, local area network (LAN) 41, wireless LAN 43, wide area network (WAN) 42, routers 53 and servers 54. In the preferred embodiment, an adjunct network entity 50 provides a node or platform for particular applications ("application nodes") 51, illustrated as application nodes 51A, 51B through 51N, to perform various functions such as providing downloads of configuration information, executable modules 70, authentication, security, authorization, and compatibility evaluation. In addition to inclusion within an adjunct network entity 50, these various application nodes 51 may also be distributed among or included within the other various devices, such as within one or more servers 54. For example, one server 54 may be utilized to provide configuration information, with an adjunct network entity 50 utilized for authentication and security, with tracking and accounting occurring at yet another server 54 or computer 55.

For purposes of explanation and not limitation, the various systems of the present invention, as illustrated in FIG. 2, include: system 11 (ACE 100 of wireline device 35 with configuration information or modules 70 in FLASH 10); system 16 (ACE 100 of wireless device 30 with configuration information or modules 70 in silverware storage medium 15); system 31 (ACE 100 of wireless device 32 with configuration information or modules 70 stored in a form of memory (separately illustrated in FIG. 3), such as RAM or a matrix interconnection network ("MIN"), discussed below); system 21 (ACE 100 of computer 55B with configuration information or modules 70 stored in computer readable medium 20; system 22 (ACE 100 of server 54B with configuration information or modules 70 stored in a form of memory (separately illustrated in FIG. 3); and system 23 (ACE 100 of router 5313 with configuration information or modules 70 stored in a memory (separately illustrated in FIG. 3). As may be apparent, a system of the present invention may be embodied within any device or other article, in addition to those illustrated (e.g., LAN 41, wireless LAN 43, WAN 42, and adjunct network entity 50), which include both an ACE 100 and configuration information (or module 70) for the provision of a corresponding operating mode, and may otherwise be co-extensive with any particular apparatus or other embodiment.

Other network or distribution level systems are also included within the scope of the present invention. Exemplary network systems may include one or more application nodes 51, in an adjunct network entity 50 or other server 54, which provide configuration information or silverware modules (configuration information coupled with data), such as a module 70, for use by an ACE 100. By storing such configuration and other information, such network or distribution level systems effectively store "hardware" on the "net". Such network or distribution level systems, in response to a request from or on behalf of an ACE 100, in the preferred embodiment, may provide one or more of the following: one or more sets of configuration information; content or other data modified for use with configuration information; silverware modules (70) combining configuration information with corresponding data or other content; configuration information tailored or watermarked for a unique device; and/or encryption of configuration information or silverware modules.

Distributed systems are also within the scope of the present invention, as configuration information does not need to be local to any given ACE 100 device. For example, configuration information or silverware may be stored across a network 40, such as between and among application nodes 51, adjunct network entity 50, other server 54, and the other illustrated elements of FIG. 1. For such distributed systems, the ACE 100 may only be configured, such as through an operating system ("OS"), to obtain the configuration information, such as through one of these network devices.

Other distributed systems, within the scope of the present invention, are comprised of clusters of ACE 100 devices, which are configured to be aware of each other. For example, wireless IP routing could occur by nearest neighboring ACEs, each configured for both reception and transmission operating modes. Other ACE clusters could perform parallel processing tasks, act as a distributed antenna system, or otherwise perform interactive functions.

Figure 3:
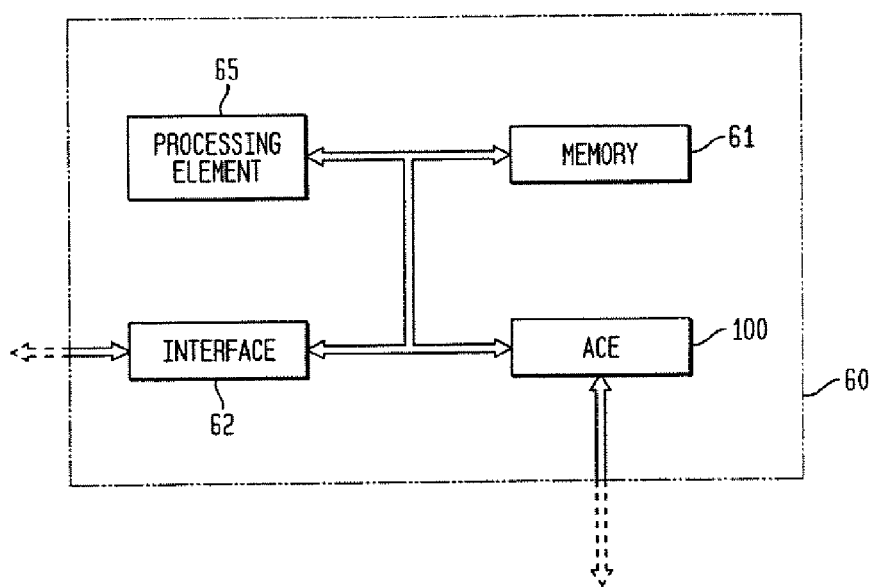
FIG. 3 is a block diagram illustrating an integrated system embodiment in accordance with the present invention.

FIG. 3 is a block diagram illustrating an integrated system embodiment 60 in accordance with the present invention. The system 60 is preferably implemented as a single integrated circuit (system on a chip or "SOC"). The system 60 includes an ACE 100, and may also include a memory 61, an interface 62 and one or more other processing elements 65. Such a system 60, for example, may be included within routers 53 and servers 54 of FIG. 2, or may be included within other embedded systems, such as within mobile stations or devices 30 and 32, wireline device 35, and so on. When the system 60 is comprised solely of an ACE 100, as discussed in greater detail below, that ACE 100 will generally be configured to include processing, interface and other I/O functionality, with memory configured either through memory computational elements or directly within the matrix interconnection network (MIN). The system 60, as illustrated in FIG. 2 with optional processing element 65, interface 62, and memory 61, will typically be implemented to provide backwards or retro-compatibility with existing or other legacy systems and devices.

The interface 62 is utilized for appropriate connection to a relevant channel, network or bus; for example, the interface 62 may provide impedance matching, drivers and other functions for a wireline interface, may provide demodulation and analog to digital conversion for a wireless interface, and may provide a physical interface for the memory 61 with other devices. In general, the interface 62 is used to receive and transmit data, depending upon the selected embodiment, such as voice information, configuration information, silverware modules (70), control messages, authentication data and other pertinent information. The ACE 100 may also be configured to provide the functionality of the interface 62, including internal IC input/output ("I/O") and external (off-chip) I/O, such as for PCI bus control. The memory 61 may be an integrated circuit or portion of an integrated circuit, such as various forms of RAM, DRAM, SRAM, FeRAM, MRAM, ROM, EPROM, $E^2$PROM, flash, and so on. For non-IC (or non-SOC) embodiments, the memory 61 may also be a magnetic (hard of floppy) drive, an optical storage device, or any other type of data storage apparatus and, as indicated above, may be distributed across multiple devices. In addition, depending upon the selected embodiment, and as discussed in greater detail below, the memory 61 may also be included within the ACE 100, through memory computational elements or within the matrix interconnection network (MIN). One or more processing elements 65 optionally may be included within system 60, to provide any additional processing capability, such as reduced instruction set ("RISC") processing, or may be included as computational elements within the ACE 100.

The use and/or creation of modules 70, and the operation of the various systems illustrated in FIGS. 2 and 3 are discussed in greater detail below, with reference to FIGS. 4-10 and corresponding explanation of the ACE 100 architecture.

Figure 4:
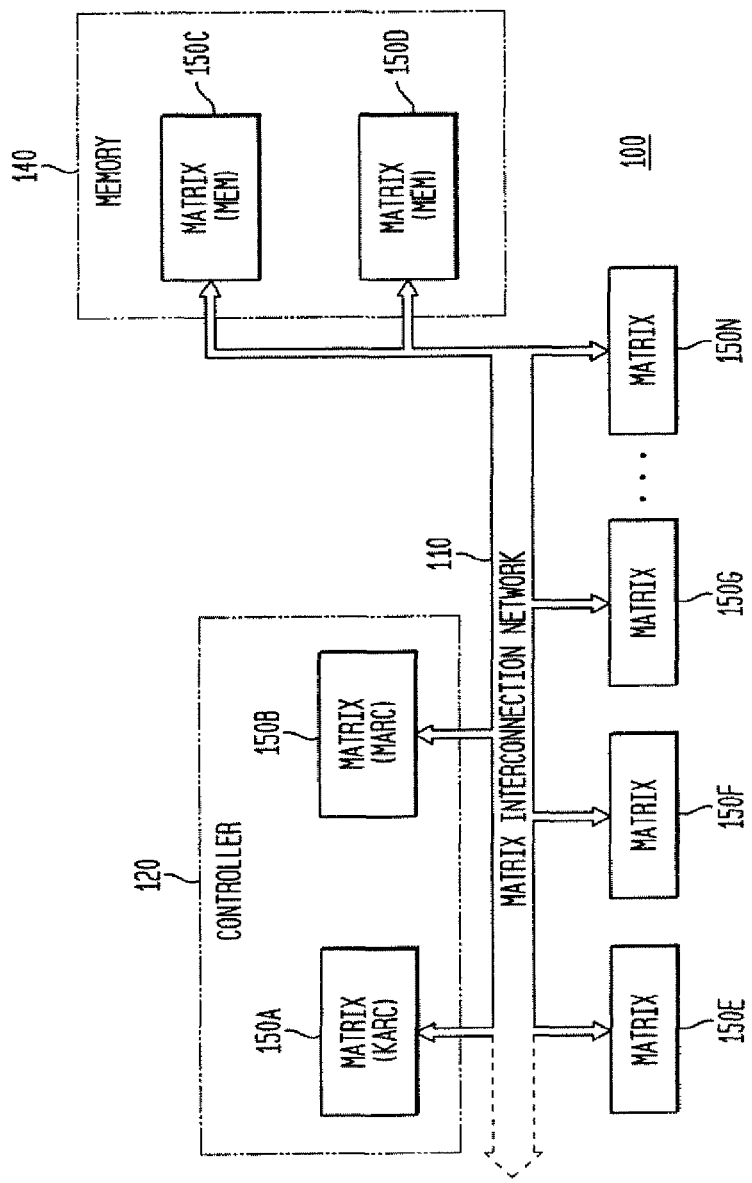
FIG. 4 is a block diagram illustrating a preferred adaptive computing engine (ACE) embodiment in accordance with the present invention.
Figure 5:
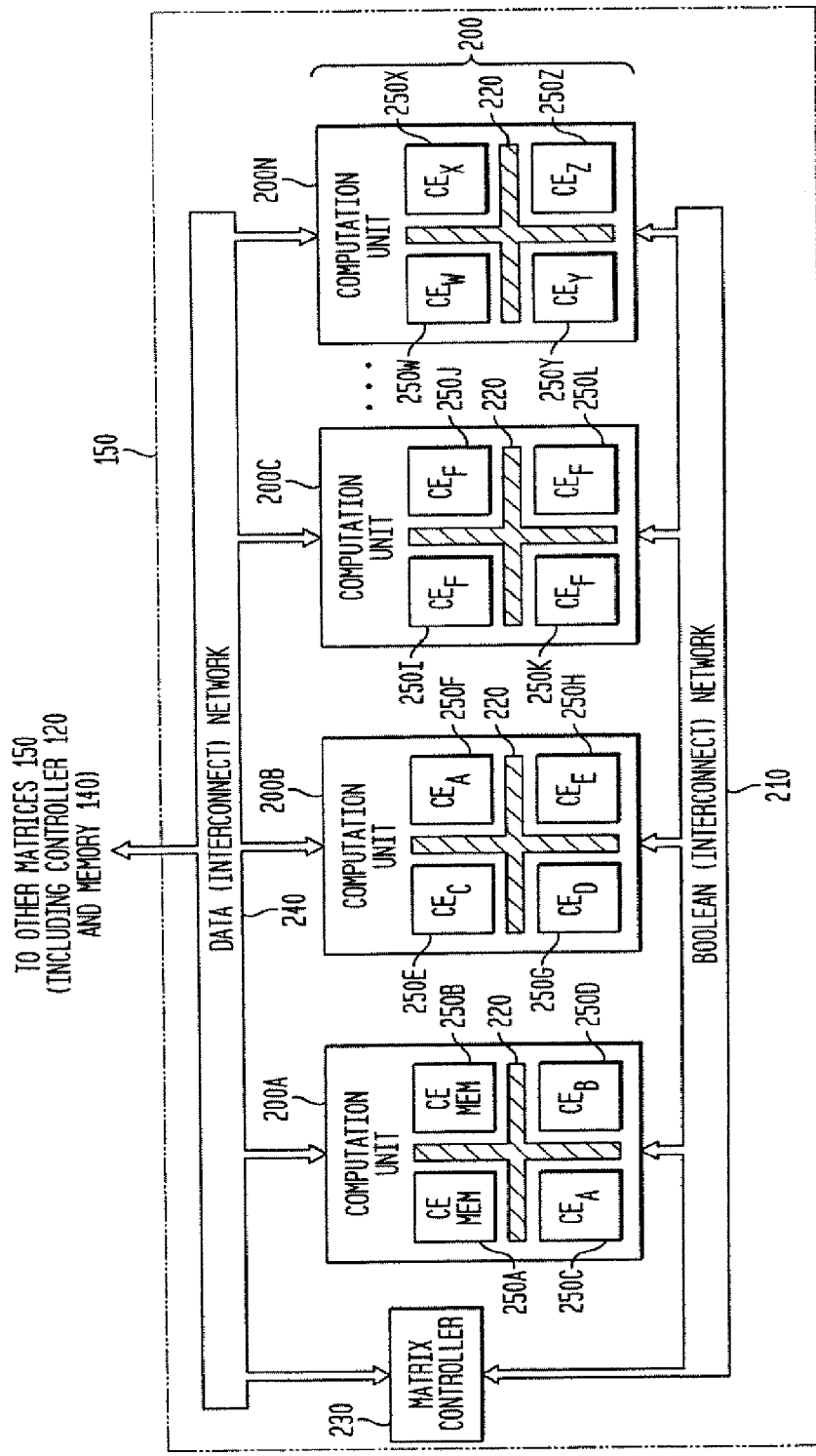
FIG. 5 is a block diagram illustrating a reconfigurable matrix, a plurality of computation units, and a plurality of computational elements, in accordance with the present invention.
Figure 7B:
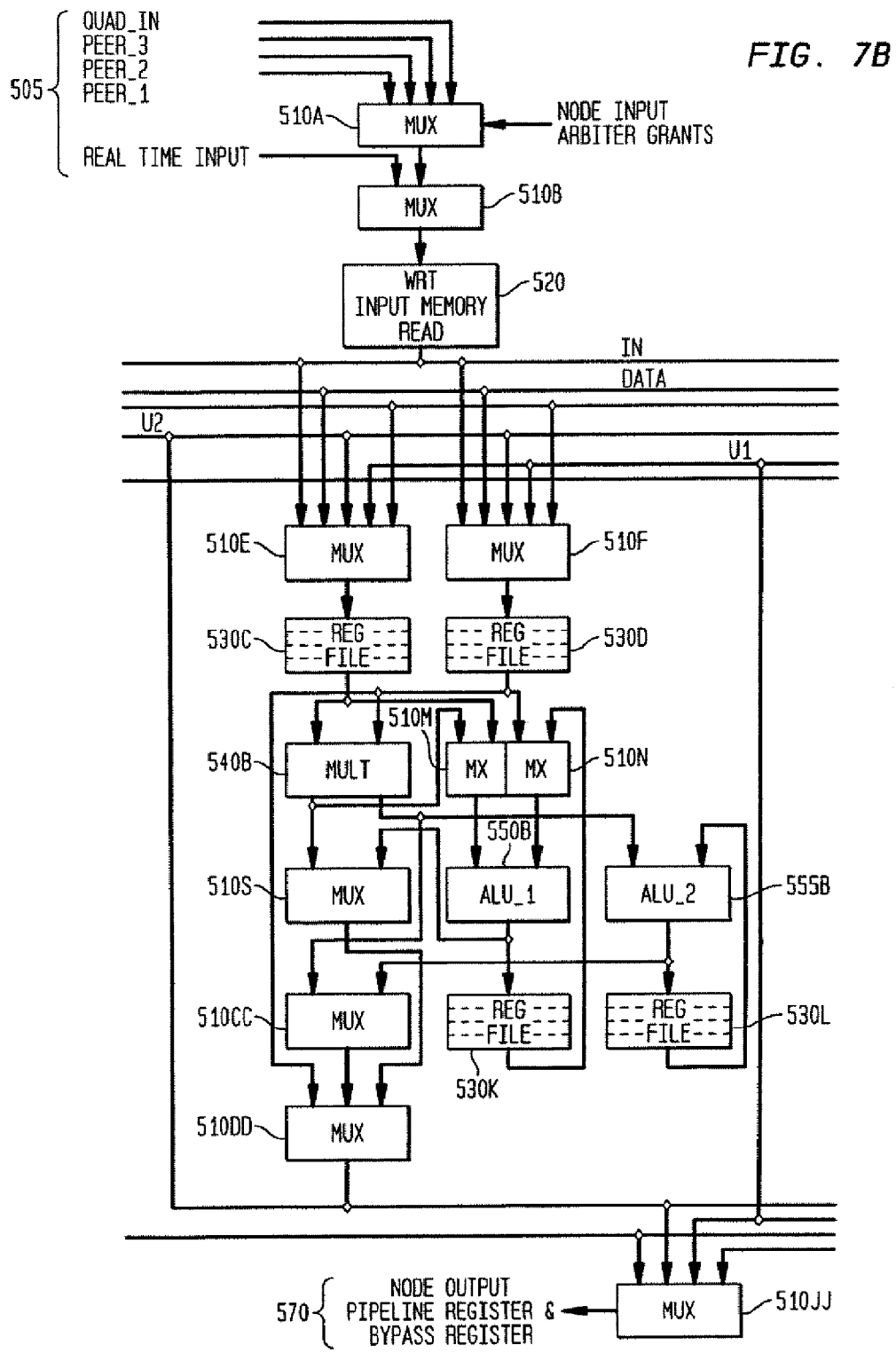
Figure 7C:
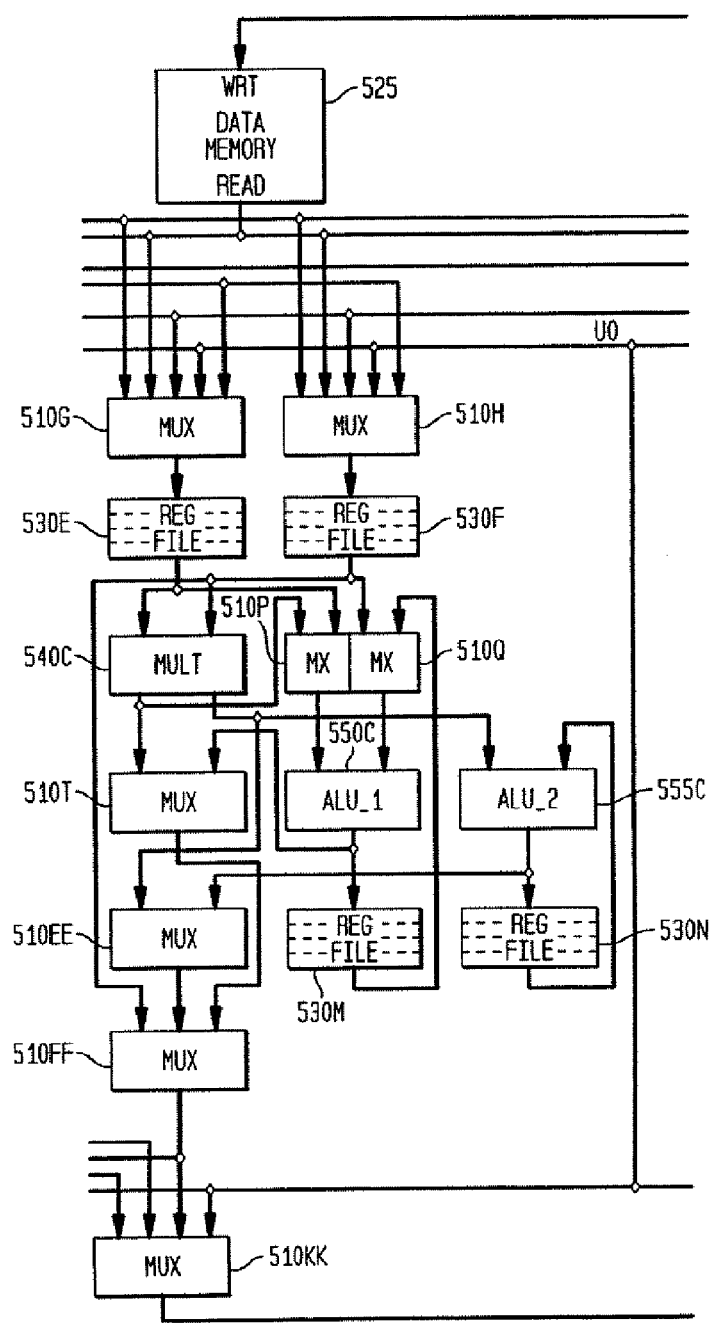
Figure 7D:
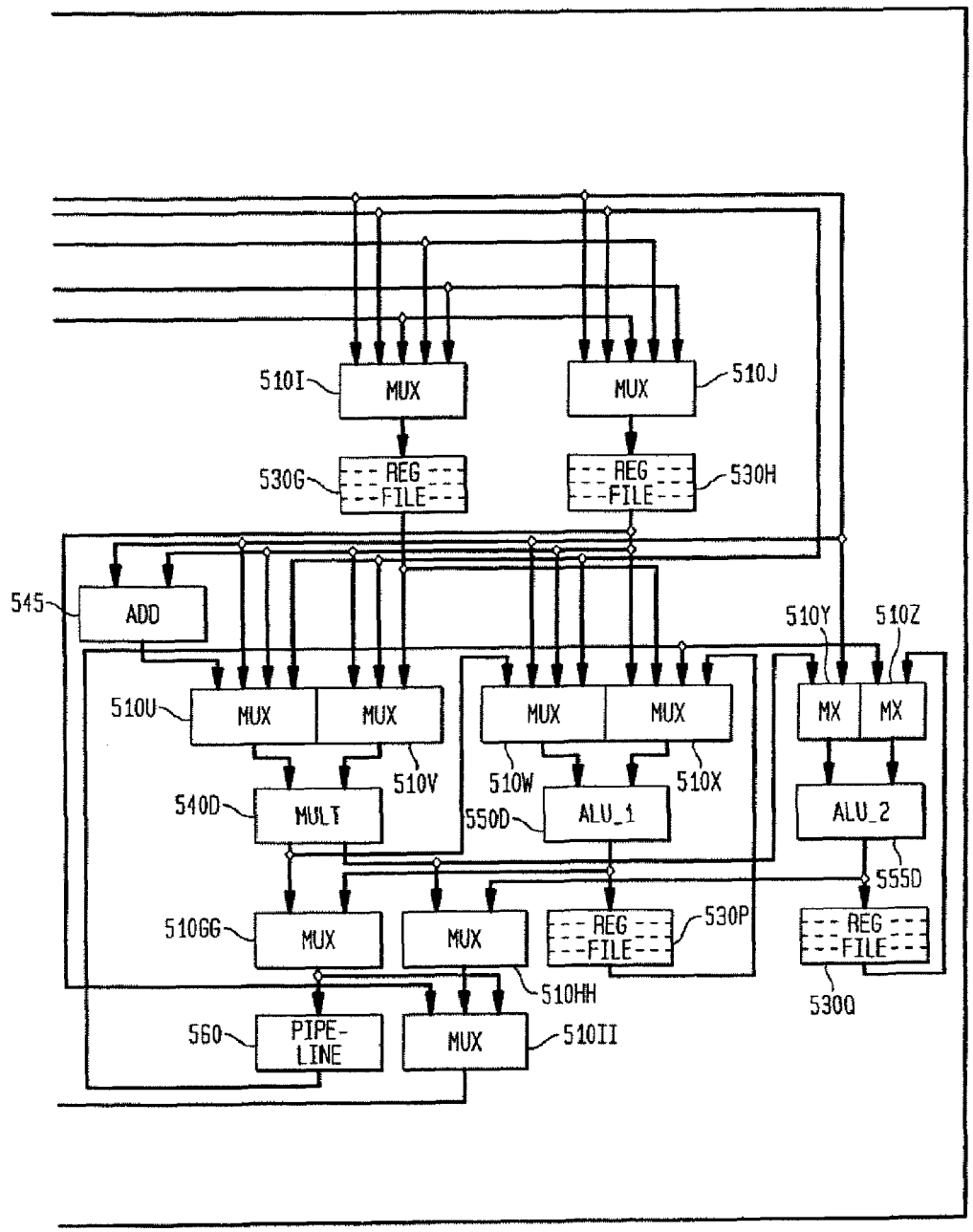

FIG. 4 is a block diagram illustrating a preferred ACE apparatus 100 embodiment in accordance with the present invention. The ACE 100 is preferably embodied as an integrated circuit, or as a portion of an integrated circuit having other, additional components. (The ACE 100 is also described in detail in the related application.) In the preferred embodiment, and as discussed in greater detail below, the ACE 100 includes one or more reconfigurable matrices (or nodes) 150, such as matrices 150A through 150N as illustrated, and a matrix interconnection network (MIN) 110. Also in the preferred embodiment, and as discussed in detail below, one or more of the matrices 150, such as matrices 150A and 150B, are configured for functionality as a controller 120, while other matrices, such as matrices 150C and 150D, are configured for functionality as a memory 140. While illustrated as separate matrices 150A through 150D, it should be noted that these control and memory functionalities may be, and preferably are, distributed across a plurality of matrices 150 having additional functions to, for example, avoid any processing or memory "bottlenecks" or other limitations. Such distributed functionality, for example, is illustrated in FIG. 5. The various matrices 150 and matrix interconnection network 110 may also be implemented together as fractal subunits, which may be scaled from a few nodes to thousands of nodes. As mentioned above, in the preferred embodiment, the adjunct network entity 50 of the present invention is embodied as an ACE 100 or as one or more matrices 150 (with corresponding interconnection networks).

A significant departure from the prior art, the ACE 100 does not utilize traditional (and typically separate) data, direct memory access ("DMA"), random access, configuration and instruction busses for signaling and other transmission between and among the reconfigurable matrices 150, the controller 120, and the memory 140, or for other I/O functionality. Rather, data, control (such as power and timing information) and configuration information are transmitted between and among these matrix 150 elements, utilizing the matrix interconnection network 110, which may be configured and reconfigured, to provide any given connection between and among the reconfigurable matrices 150, including those matrices 150 configured as the controller 120 and the memory 140, as discussed in greater detail below.

It should also be noted that once configured, the MIN 110 also and effectively functions as a memory, directly providing the interconnections for particular functions, until and unless it is reconfigured. In addition, such configuration and reconfiguration may occur in advance of the use of a particular function or operation, and/or may occur in real-time or at a slower rate, namely, in advance of, during or concurrently with the use of the particular function or operation. Such configuration and reconfiguration, moreover, may be occurring in a distributed fashion without disruption of function or operation, with computational elements in one location being configured while other computational elements (having been previously configured) are concurrently performing their designated function. This configuration flexibility of the ACE 100 contrasts starkly with FPGA reconfiguration, both which generally occurs comparatively slowly, not in real-time or concurrently with use, and which must be completed in its entirety prior to any operation or other use.

The matrices 150 configured to function as memory 140 may be implemented in any desired or preferred way, utilizing computational elements (discussed below) of fixed memory elements, and may be included within the ACE 100 or incorporated within another IC or portion of an IC (such as memory 61). In the preferred embodiment, the memory 140 is included within the ACE 100, and preferably is comprised of computational elements which are low power consumption random access memory (RAM), but also may be comprised of computational elements of any other form of memory, such as flash, DRAM, SRAM, MRAM, ROM, EPROM or E$^2$PROM. As mentioned, this memory functionality may also be distributed across multiple matrices 150, and may be temporally embedded, at any given time, as a particular MIN 110 configuration. In addition, in the preferred embodiment, the memory 140 preferably includes direct memory access (DMA) engines, not separately illustrated.

The controller 120 is preferably implemented, using matrices 150A and 150B configured as adaptive finite state machines, as a reduced instruction set ("RISC") processor, controller or other device or IC capable of performing the two types of functionality discussed below. (Alternatively, these functions may be implemented utilizing a conventional RISC or other processor, such as a processing element 65 of FIG. 3.) This control functionality may also be distributed throughout one or more matrices 150 which perform other, additional functions as well. In addition, this control functionality may be included within and directly embodied as configuration information, without separate hardware controller functionality. The first control functionality, referred to as "kernel" control, is illustrated as kernel controller ("KARC") of matrix 150A, and the second control functionality, referred to as "matrix" control, is illustrated as matrix controller ("MARC") of matrix 150B. The kernel and matrix control functions of the controller 120 are explained in greater detail below, with reference to the configurability and reconfigurability of the various matrices 150, and with reference to the preferred form of combined data, configuration (and other control) information referred to herein interchangeably as "silverware" or as a "silverware" module, such as a module 70.

The matrix interconnection network 110 of FIG. 4, and its subset interconnection networks separately illustrated in FIGS. 5 and 6 (Boolean interconnection network 210, data interconnection network 240, and interconnect 220), collectively and generally referred to herein as "interconnect", "interconnection(s)", "interconnection network(s)" or MIN, may be implemented generally as known in the art, such as utilizing field programmable gate array ("FPGA") interconnection networks or switching fabrics, albeit in a considerably more varied fashion. As used herein, "field programmability" refers to the capability for post-fabrication adding or changing of actual IC functionality, as opposed to programming of existing IC structure or function (such as in a microprocessor or DSP). In the preferred embodiment, the various interconnection networks are implemented as described, for example, in U.S. Pat. No. 5,218,240, U.S. Pat. No. 5,336,950, U.S. Pat. No. 5,245,227, and U.S. Pat. No. 5,144,166, and also as discussed below and as illustrated with reference to FIGS. 8, 9 and 10. These various interconnection networks provide selectable (routable or switchable) connections between and among the controller 120, the memory 140, the various matrices 150, and the computational units 200 and computational elements 250 discussed below, providing the physical basis for the configuration and reconfiguration referred to herein, in response to and under the control of configuration signaling generally referred to herein as "configuration information" (and provided in modules 70). In addition, the various interconnection networks (110, 210, 240 and 220) provide selectable or switchable data, input, output, control and configuration paths, between and among the controller 120, the memory 140, the various matrices 150, and the computational units 200 and computational elements 250, in lieu of any form of traditional or separate input/output busses, data busses, DMA, RAM, configuration and instruction busses.

It should be pointed out, however, that while any given switching or selecting operation of or within the various interconnection networks (110, 210, 240 and 220) may be implemented as known in the art, the design and layout of the various interconnection networks (110, 210, 240 and 220), in accordance with the present invention, are new and novel, as discussed in greater detail below. For example, varying levels of interconnection are provided to correspond to the varying levels of the matrices 150, the computational units 200, and the computational elements 250, discussed below. At the matrix 150 level, in comparison with the prior art FPGA interconnect, the matrix interconnection network 110 is considerably more limited and less "rich", with lesser connection capability in a given area, to reduce capacitance and increase speed of operation. Within a particular matrix 150 or computational unit 200, however, the interconnection network (210, 220 and 240) may be considerably more dense and rich, to provide greater adaptation and reconfiguration capability within a narrow or close locality of reference.

The various matrices or nodes 150 are reconfigurable and heterogeneous, namely, in general, and depending upon the desired configuration: reconfigurable matrix 150A is generally different from reconfigurable matrices 150B through 150N; reconfigurable matrix 150E is generally different from reconfigurable matrices 150A and 150C through 150N; reconfigurable matrix 150C is generally different from reconfigurable matrices 150A, 150B and 150D through 150N, and so on. The various reconfigurable matrices 150 each generally contain a different or varied mix of adaptive and reconfigurable computational (or computation) units (200); the computational units 200, in turn, generally contain a different or varied mix of fixed, application specific computational elements (250), discussed in greater detail below with reference to FIGS. 4, 5 and 6, which may be adaptively connected, configured and reconfigured in various ways to perform varied functions, through the various interconnection networks. In addition to varied internal configurations and reconfigurations, the various matrices 150 may be connected, configured and reconfigured at a higher level, with respect to each of the other matrices 150, through the matrix interconnection network 110, also as discussed in greater detail below.

Several different, insightful and novel concepts are incorporated within the ACE 100 architecture of the present invention, and provide a useful explanatory basis for the real-time operation of the ACE 100 and its inherent advantages.

The first novel concepts of the present invention concern the adaptive and reconfigurable use of application specific, dedicated or fixed hardware units (computational elements 250), and the selection of particular functions for acceleration, to be included within these application specific, dedicated or fixed hardware units (computational elements 250) within the computational units 200 (FIG. 5) of the matrices 150, such as pluralities of multipliers, complex multipliers, and adders, each of which are designed for optimal execution of corresponding multiplication, complex multiplication, and addition functions. Given that the ACE 100 is to be optimized, in the preferred embodiment, for low power consumption, the functions for acceleration are selected based upon power consumption. For example, for a given application such as mobile communication, corresponding C (or C++) or other code may be analyzed for power consumption. Such empirical analysis may reveal, for example, that a small portion of such code, such as 10%, actually consumes 90% of the operating power when executed. In accordance with the present invention, on the basis of such power utilization, this small portion of code is selected for acceleration within certain types of the reconfigurable matrices 150, with the remaining code, for example, adapted to run within matrices 150 configured as controller 120. Additional code may also be selected for acceleration, resulting in an optimization of power consumption by the ACE 100, up to any potential trade-off resulting from design or operational complexity. In addition, as discussed with respect to FIG. 5, other functionality, such as control code, may be accelerated within matrices 150 when configured as finite state machines. Through the varying levels of interconnect, corresponding algorithms are then implemented, at any given time, through the configuration and reconfiguration of fixed computational elements (250), namely, implemented within hardware which has been optimized and configured for efficiency, i.e., a "machine" is configured in real-time which is optimized to perform the particular algorithm.

The next and perhaps most significant concept of the present invention, and a marked departure from the concepts and precepts of the prior art, is the concept of reconfigurable "heterogeneity" utilized to implement the various selected algorithms mentioned above. As indicated in the related application, prior art reconfigurability has relied exclusively on homogeneous FPGAs, in which identical blocks of logic gates are repeated as an array within a rich, programmable interconnect, with the interconnect subsequently configured to provide connections between and among the identical gates to implement a particular function, albeit inefficiently and often with routing and combinatorial problems. In stark contrast, in accordance with the present invention, within computation units 200, different computational elements (250) are implemented directly as correspondingly different fixed (or dedicated) application specific hardware, such as dedicated multipliers, complex multipliers, and adders. Utilizing interconnect (210 and 220), these differing, heterogeneous computational elements (250) may then be adaptively configured, in advance, in real-time or perhaps at a slower rate, to perform the selected algorithm, such as the performance of discrete cosine transformations often utilized in mobile communications. As a consequence, in accordance with the present invention, different ("heterogeneous") computational elements (250) are configured and reconfigured, at any given time, to optimally perform a given algorithm or other function. In addition, for repetitive functions, a given instantiation or configuration of computational elements may also remain in place over time, i.e., unchanged, throughout the course of such repetitive calculations. Such temporal stability of a given configuration may be indicated in a module 70, for example, through a loop field (discussed above), or simply left in place by not providing another (competing) configuration of the same computational elements.

The temporal nature of the ACE 100 architecture should also be noted. At any given instant of time, utilizing different levels of interconnect (110, 210, 240 and 220), a particular configuration may exist within the ACE 100 which has been optimized to perform a given function or implement a particular algorithm, such as to implement pilot signal searching for a CDMA operating mode in a mobile station 30 or 32. At another instant in time, the configuration may be changed, to interconnect other computational elements (250) or connect the same computational elements 250 differently, for the performance of another function or algorithm, such as multipath reception for a CDMA operating mode. Two important features arise from this temporal reconfigurability. First, as algorithms may change over time to, for example, implement a new technology standard, the ACE 100 may co-evolve and be reconfigured to implement the new algorithm. Second, because computational elements are interconnected at one instant in time, as an instantiation of a given algorithm, and then reconfigured at another instant in time for performance of another, different algorithm, gate (or transistor) utilization is maximized, providing significantly better performance than the most efficient ASICs relative to their activity factors. This temporal reconfigurability also illustrates the memory functionality inherent in the MIN 110, as mentioned above.

This temporal reconfigurability of computational elements 250, for the performance of various different algorithms, also illustrates a conceptual distinction utilized herein between configuration and reconfiguration, on the one hand, and programming or reprogrammability, on the other hand. Typical programmability utilizes a pre-existing group or set of functions, which may be called in various orders, over time, to implement a particular algorithm. In contrast, configurability and reconfigurability, as used herein, includes the additional capability of adding or creating new functions which were previously unavailable or non-existent.

Next, the present invention also utilizes a tight coupling (or interdigitation) of data and configuration (or other control) information, within a plurality of packets or within one, effectively continuous stream of information. This coupling or commingling of data and configuration information, referred to as "silverware" or as a "silverware" module, is illustrated in FIG. 1. This coupling of data and configuration information into one information (or bit) stream, which may be continuous or divided into packets, helps to enable real-time reconfigurability of the ACE 100, without a need for the (often unused) multiple, overlaying networks of hardware interconnections of the prior art. For example, as an analogy, a particular, first configuration of computational elements 250 at a particular, first period of time, as the hardware to execute a corresponding algorithm during or after that first period of time, may be viewed or conceptualized as a hardware analog of "calling" a subroutine in software which may perform the same algorithm. As a consequence, once the configuration of the computational elements 250 has occurred (i.e., is in place), as directed by (a first subset of) the configuration information, the data for use in the algorithm is immediately available as part of the silverware module. Referring to FIG. 1, this is illustrated by "calling" various configurations (through references or flags in fields 80 and 81, for example, for configurations "A" and "B"), closely followed by providing the data for use in these configurations (fields 83 and 84 for configuration "A", fields 86 and 87 for configuration "B"). The same computational elements 250 may then be reconfigured for a second period of time, as directed by second configuration information (i.e., a second subset of configuration information), for execution of a second, different algorithm, also utilizing immediately available data. The immediacy of the data, for use in the configured computational elements 250, provides a one or two clock cycle hardware analog to the multiple and separate software steps of determining a memory address and fetching stored data from the addressed registers. This has the further result of additional efficiency, as the configured computational elements 250 may execute, in comparatively few clock cycles, an algorithm which may require orders of magnitude more clock cycles for execution if called as a subroutine in a conventional microprocessor or digital signal processor ("DSP").

This use of silverware modules, such as module 70, as a commingling of data and configuration information, in conjunction with the reconfigurability of a plurality of heterogeneous and fixed computational elements 250 to form adaptive, different and heterogeneous computation units 200 and matrices 150, enables the ACE 100 architecture to have multiple and different modes of operation. For example, when included within a hand-held device, given a corresponding silverware module, the ACE 100 may have various and different operating modes as a cellular or other mobile telephone, a music player, a pager, a personal digital assistant, and other new or existing functionalities. In addition, these operating modes may change based upon the physical location of the device. For example, in accordance with the present invention, while configured for a first operating mode, using a first set of configuration information, as a CDMA mobile telephone for use in the United States, the ACE 100 may be reconfigured using a second set of configuration information for an operating mode as a GSM mobile telephone for use in Europe.

Referring again to FIG. 4, the functions of the controller 120 (preferably matrix (KARC) 150A and matrix (MARC) 150B, configured as finite state machines) may be explained with reference to a silverware module, namely, the tight coupling of data and configuration information within a single stream of information, with reference to multiple potential modes of operation, with reference to the reconfigurable matrices 150, and with reference to the reconfigurable computation units 200 and the computational elements 250 illustrated in FIG. 5. As indicated above, through a silverware module, the ACE 100 may be configured or reconfigured to perform a new or additional function, such as an upgrade to a new technology standard or the addition of an entirely new function, such as the addition of a music function to a mobile communication device. Such a silverware module may be stored in the matrices 150 of memory 140, or may be input from an external (wired or wireless) source through, for example, matrix interconnection network 110. In the preferred embodiment, one of the plurality of matrices 150 is configured to decrypt such a module and verify its validity, for security purposes. Next, prior to any configuration or reconfiguration of existing ACE 100 resources, the controller 120, through the matrix (KARC) 150A, checks and verifies that the configuration or reconfiguration may occur without adversely affecting any pre-existing functionality, such as whether the addition of music functionality would adversely affect pre-existing mobile communications functionality. In the preferred embodiment, the system requirements for such configuration or reconfiguration are included within the silverware module or configuration information, for use by the matrix (KARC) 150A in performing this evaluative function. If the configuration or reconfiguration may occur without such adverse affects, the silverware module is allowed to load into the matrices 150 (of memory 140), with the matrix (KARC) 150A setting up the DMA engines within the matrices 150C and 150D of the memory 140 (or other stand-alone DMA engines of a conventional memory). If the configuration or reconfiguration would or may have such adverse affects, the matrix (KARC) 150A does not allow the new module to be incorporated within the ACE 100.

Continuing to refer to FIG. 4, the matrix (MARC) 150B manages the scheduling of matrix 150 resources, clocking and the timing of any corresponding data, to synchronize any configuration or reconfiguration of the various computational elements 250 and computation units 200 with any corresponding input data and output data. In the preferred embodiment, timing or other clocking information is also included within a silverware module, to allow the matrix (MARC) 150B through the various interconnection networks to direct a reconfiguration of the various matrices 150 in time, and preferably just in time, for the reconfiguration to occur before corresponding data has appeared at any inputs of the various reconfigured computation units 200. In addition, the matrix (MARC) 150B may also perform any residual processing which has not been accelerated within any of the various matrices 150.

This timing information may be embodied, for example, as the references or flags in fields 80, 81, 85, and 89 as illustrated in module 70 of FIG. 1, to "call" the various configurations prior to the arrival of corresponding data (fields 84, 87, 91, 93, 95 and 97). In other circumstances, such as when configuration information has been provided to an ACE 100 in advance of and separately from user data, such as in mobile communications, this information may be injected or inserted into a user data stream for example, when transmitted or downloaded, to "call" appropriate configurations in advance of the reception of corresponding user data. In other circumstances, the matrix (MARC) 150E may itself insert these configuration references or flags, in real-time, into the data stream that is being processed by the various other matrices 150, to "call" and configure the appropriate computational elements 250. In addition, the matrix (MARC) 150B may also provide and insert the configuration and data routing information, for self-routing of the configuration information and the user data within the various matrices 150 (illustrated as fields 72, 74, 76, 78, 83, 86, 88, 90, 92, 94, and 96 in FIG. 1), may provide and insert the power control fields (field 82) (to independently providing clocking (on or off) to any computational elements of the IC) and the other fields to create a module 70, such as fields 98 and 99 for information types and loop instructions. As a consequence, when an ACE 100 has not been provided with a module 70 directly, but has been provided with configuration information separately from user data, the matrix (MARC) 150B effectively creates such a module 70 for use in configuring the other matrices 150 to create the appropriate operating mode and use or operate upon the user data (incoming and outgoing).

As a consequence, the matrix (MARC) 150B may be viewed as a control unit which "calls" the configurations and reconfigurations of the matrices 150, computation units 200 and computational elements 250, in real-time, in synchronization or coordination with any corresponding data to be utilized by these various reconfigurable hardware units, and which performs any residual or other control processing. Other matrices 150 may also include this control functionality, with any given matrix 150 capable of calling and controlling a configuration and reconfiguration of other matrices 150.

FIG. 5 is a block diagram illustrating, in greater detail, a reconfigurable matrix 150 with a plurality of computation units 200 (illustrated as computation units 200A through 200N), and a plurality of computational elements 250 (illustrated as computational elements 250A through 250Z), and provides additional illustration of the preferred types of computational elements 250. As illustrated in FIG. 5, any matrix 150 generally includes a matrix controller 230, a plurality of computation (or computational) units 200, and as logical or conceptual subsets or portions of the matrix interconnection network 110, a data interconnect network 240 and a Boolean interconnect network 210. As mentioned above, in the preferred embodiment, at increasing "depths" within the ACE 100 architecture, the interconnect networks become increasingly rich, for greater levels of adaptability and reconfiguration. The Boolean interconnect network 210, also as mentioned above, provides the reconfiguration and data interconnection capability between and among the various computation units 200, and is preferably small (i.e., only a few bits wide), while the data interconnect network 240 provides the reconfiguration and data interconnection capability for data input and output between and among the various computation units 200, and is preferably comparatively large (i.e., many bits wide). It should be noted, however, that while conceptually divided into reconfiguration and data capabilities, any given physical portion of the matrix interconnection network 110, at any given time, may be operating as either the Boolean interconnect network 210, the data interconnect network 240, the lowest level interconnect 220 (between and among the various computational elements 250), or other input, output, or connection functionality.

Continuing to refer to FIG. 5, included within a computation unit 200 are a plurality of computational elements 250, illustrated as computational elements 250A through 250Z (individually and collectively referred to as computational elements 250), and additional interconnect 220. The interconnect 220 provides the reconfigurable interconnection capability and input/output paths between and among the various computational elements 250. As indicated above, each of the various computational elements 250 consist of dedicated, application specific hardware designed to perform a given task or range of tasks, resulting in a plurality of different, fixed computational elements 250. Utilizing the interconnect 220, the fixed computational elements 250 may be reconfigurably connected together into adaptive and varied computational units 200, which also may be further reconfigured and interconnected, to execute an algorithm or other function, at any given time, utilizing the interconnect 220, the Boolean network 210, and the matrix interconnection network 110.

In the preferred embodiment, the various computational elements 250 are designed and grouped together, into the various adaptive and reconfigurable computation units 200 (as illustrated, for example, in FIGS. 6 through 10). In addition to computational elements 250 which are designed to execute a particular algorithm or function, such as multiplication, correlation, or addition, other types of computational elements 250 are also utilized in the preferred embodiment. As illustrated in FIG. 5, computational elements 250A and 250B implement memory, to provide local memory elements for any given calculation or processing function (compared to the more "remote" memory 140). In addition, computational elements 250I, 250J, 250K and 250L are configured to implement finite state machines (using, for example, the computational elements illustrated in FIGS. 8, 9 and 10), to provide local processing capability (compared to the more "remote" matrix (MARC) 150B), especially suitable for complicated control processing.

With the various types of different computational elements 250 which may be available, depending upon the desired functionality of the ACE 100, the computation units 200 may be loosely categorized. A first category of computation units 200 includes computational elements 250 performing linear operations, such as multiplication, addition, finite impulse response filtering, and so on (as illustrated below, for example, with reference to FIG. 7). A second category of computation units 200 includes computational elements 250 performing non-linear operations, such as discrete cosine transformation, trigonometric calculations, and complex multiplications. A third type of computation unit 200 implements a finite state machine, such as computation unit 200C as illustrated in FIG. 5 and as illustrated in greater detail below with respect to FIGS. 8 through 10), particularly useful for complicated control sequences, dynamic scheduling, and input/output management, while a fourth type may implement memory and memory management, such as computation unit 200A as illustrated in FIG. 5. Lastly, a fifth type of computation unit 200 may be included to perform bit-level manipulation, such as for encryption, decryption, channel coding, Viterbi decoding, packet and protocol processing (such as Internet Protocol processing), and other types of processing and functions.

In the preferred embodiment, in addition to control from other matrices or nodes 150, a matrix controller 230 may also be included or distributed within any given matrix 150, also to provide greater locality of reference and control of any reconfiguration processes and any corresponding data manipulations. For example, once a reconfiguration of computational elements 250 has occurred within any given computation unit 200, the matrix controller 230 may direct that that particular instantiation (or configuration) remain intact for a certain period of time to, for example, continue repetitive data processing for a given application.

FIG. 6 is a block diagram illustrating, in greater detail, an exemplary or representative computation unit 200 of a reconfigurable matrix 150 in accordance with the present invention. As illustrated in FIG. 6, a computation unit 200 typically includes a plurality of diverse, heterogeneous and fixed computational elements 250, such as a plurality of memory computational elements 250A and 250B, and forming a computational unit ("CU") core 260, a plurality of algorithmic or finite state machine computational elements 250C through 250K. As discussed above, each computational element 250, of the plurality of diverse computational elements 250, is a fixed or dedicated, application specific circuit, designed and having a corresponding logic gate layout to perform a specific function or algorithm, such as addition or multiplication. In addition, the various memory computational elements 250A and 250B may be implemented with various bit depths, such as RAM (having significant depth), or as a register, having a depth of 1 or 2 bits.

Forming the conceptual data and Boolean interconnect networks 240 and 210, respectively, the exemplary computation unit 200 also includes a plurality of input multiplexers 280, a plurality of input lines (or wires) 281, and for the output of the CU core 260 (illustrated as line or wire 270), a plurality of output demultiplexers 285 and 290, and a plurality of output lines (or wires) 291. Through the input multiplexers 280, an appropriate input line 281 may be selected for input use in data transformation and in the configuration and interconnection processes, and through the output demultiplexers 285 and 290, an output or multiple outputs may be placed on a selected output line 291, also for use in additional data transformation and in the configuration and interconnection processes.

In the preferred embodiment, the selection of various input and output lines 281 and 291, and the creation of various connections through the interconnect (210, 220 and 240), is under control of control bits 265 from a computational unit controller 255, as discussed below. Based upon these control bits 265, any of the various input enables 251, input selects 252, output selects 253, MUX selects 254, DEMUX enables 256, DEMUX selects 257, and DEMUX output selects 258, may be activated or deactivated.

The exemplary computation unit 200 includes the computational unit controller 255 which provides control, through control bits 265, over what each computational element 250, interconnect (210, 220 and 240), and other elements (above) does with every clock cycle. Not separately illustrated, through the interconnect (210, 220 and 240), the various control bits 265 are distributed, as may be needed, to the various portions of the computation unit 200, such as the various input enables 251, input selects 252, output selects 253, MUX selects 254, DEMUX enables 256, DEMUX selects 257, and DEMUX output selects 258. The CU controller 295 also includes one or more lines 295 for reception of control (or configuration) information and transmission of status information.

As mentioned above, the interconnect may include a conceptual division into a data interconnect network 240 and a Boolean interconnect network 210, of varying bit widths, as mentioned above. In general, the (wider) data interconnection network 240 is utilized for creating configurable and reconfigurable connections, for corresponding routing of data and configuration information. The (narrower) Boolean interconnect network 210, while also utilized for creating configurable and reconfigurable connections, is utilized for control of logic (or Boolean) decisions of data flow graphs (DFGs), generating decision nodes in such DFGs, and may also be used for data routing within such DFGs.

FIGS. 7A-7D are a block diagram illustrating, in detail, an exemplary, preferred multi-function adaptive computational unit 500 having a plurality of different, fixed computational elements, in accordance with the present invention. When configured accordingly, the adaptive computation unit 500 performs a wide variety of functions discussed in the related application, such as finite impulse response filtering, fast Fourier transformation, and other functions such as discrete cosine transformation, useful for communication operating modes. As illustrated, this multi-function adaptive computational unit 500 includes capability for a plurality of configurations of a plurality of fixed computational elements, including input memory 520, data memory 525, registers 530 (illustrated as registers 530A through 530Q), multipliers 540 (illustrated as multipliers 540A through 540D), adder 545, first arithmetic logic unit (ALU) 550 (illustrated as ALU_1s 550A through 550D), second arithmetic logic unit (ALU) 555 (illustrated as ALU_2s 555A through 555D), and pipeline (length 1) register 560, with inputs 505, lines 515, outputs 570, and multiplexers (MUXes or MXes) 510 (illustrates as MUXes and MXes 510A through 510KK) forming an interconnection network (210, 220 and 240). The two different ALUs 550 and 555 are preferably utilized, for example, for parallel addition and subtraction operations, particularly useful for radix 2 operations in discrete cosine transformation.

Figure 8A:
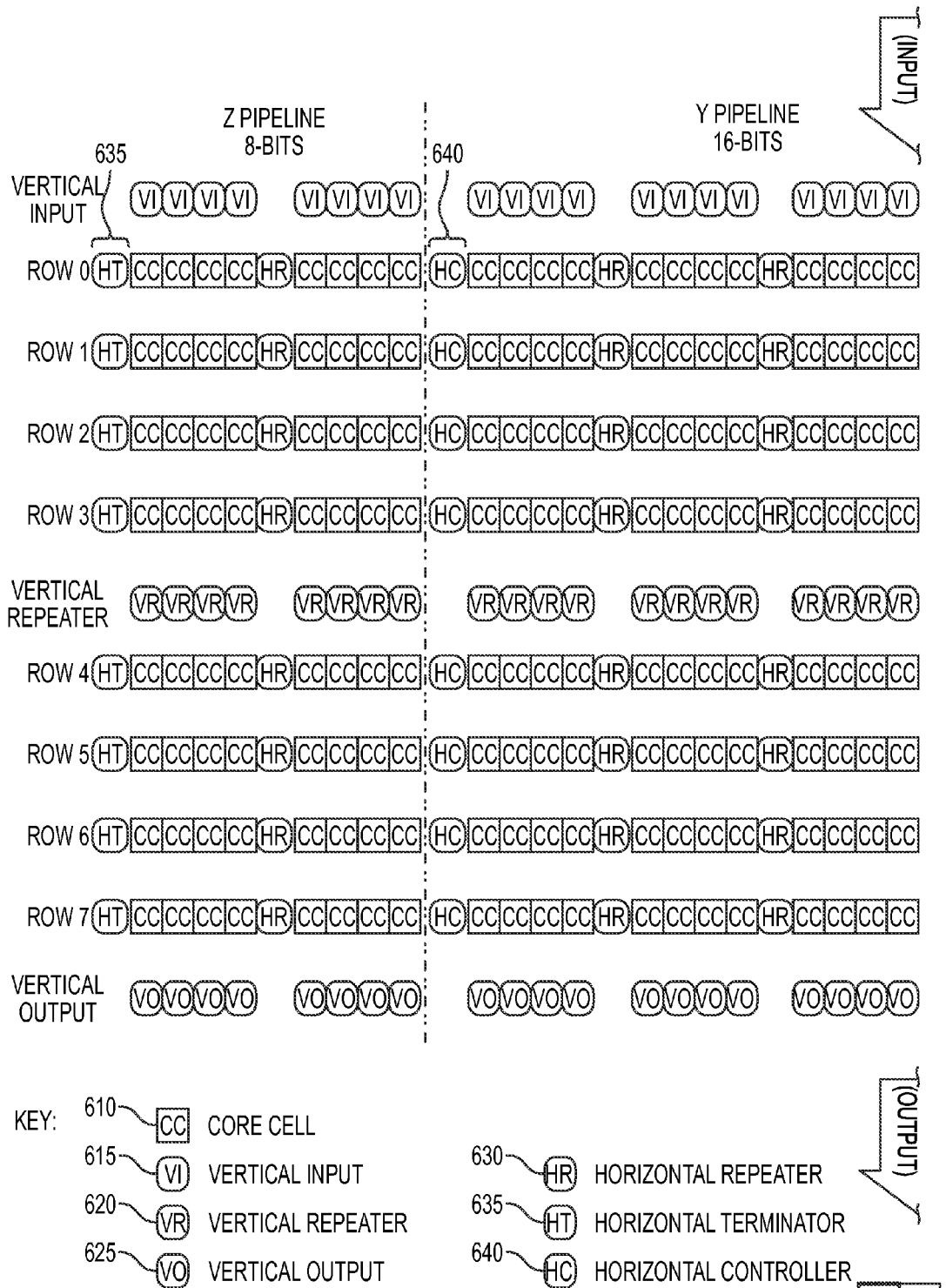
FIGS. 8A-8B are a block diagram illustrating, in detail, a preferred adaptive logic processor computational unit having a plurality of fixed computational elements, in accordance with the present invention.
Figure 8B:
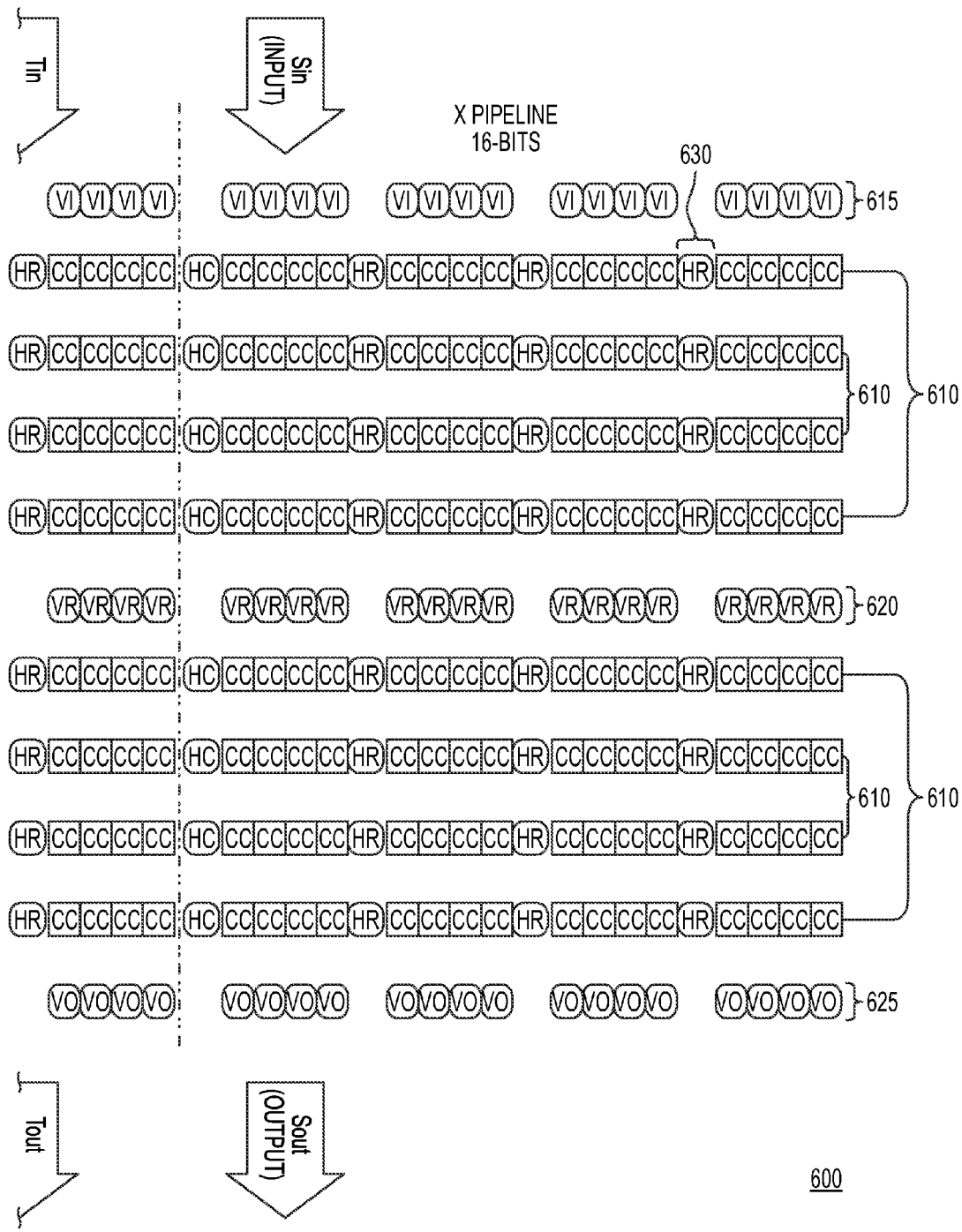

FIGS. 8A-8B are a block diagram illustrating, in detail, a preferred adaptive logic processor (ALP) computational unit 600 having a plurality of fixed computational elements, in accordance with the present invention. The ALP 600 is highly adaptable, and is preferably utilized for input/output configuration, finite state machine implementation, general field programmability, and bit manipulation. The fixed computational element of ALP 600 is a portion (650) of each of the plurality of adaptive core cells (CCs) 610 (FIG. 9), as separately illustrated in FIG. 10. An interconnection network (210, 220 and 240) is formed from various combinations and permutations of the pluralities of vertical inputs (VIs) 615, vertical repeaters (VRs) 620, vertical outputs (VOs) 625, horizontal repeaters (HRs) 630, horizontal terminators (HTs) 635, and horizontal controllers (HCs) 640.

Figure 9:
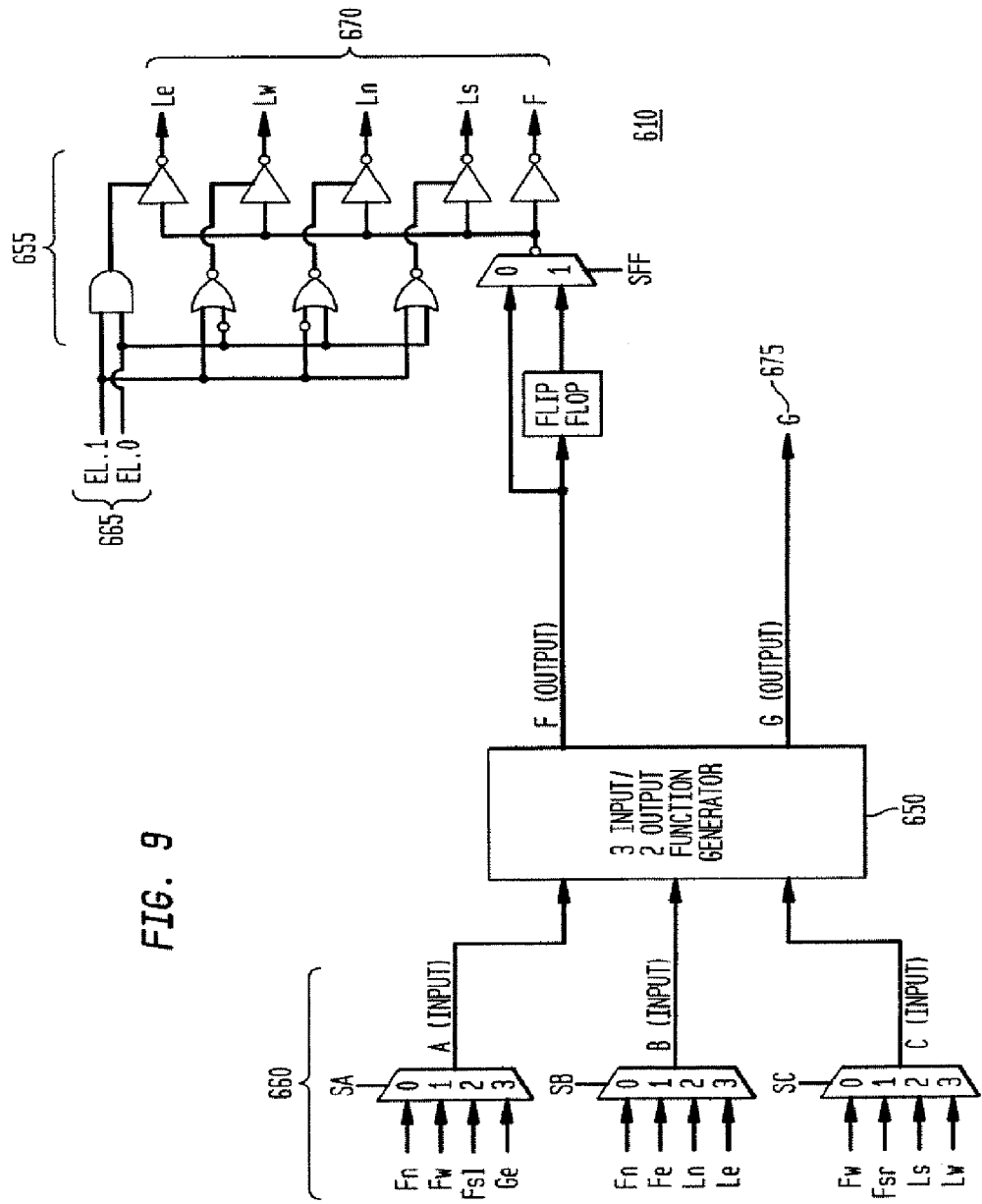
FIG. 9 is a block diagram illustrating, in greater detail, a preferred core cell of an adaptive logic processor computational unit with a fixed computational element, in accordance with the present invention.

FIG. 9 is a block diagram illustrating, in greater detail, a preferred core cell 610 of an adaptive logic processor computational unit 600 with a fixed computational element 650, in accordance with the present invention. The fixed computational element is a 3-input-2-output function generator 550, separately illustrated in FIG. 10. The preferred core cell 610 also includes control logic 655, control inputs 665, control outputs 670 (providing output interconnect), output 675, and inputs (with interconnect mixes) 660 (providing input interconnect).

Figure 10:
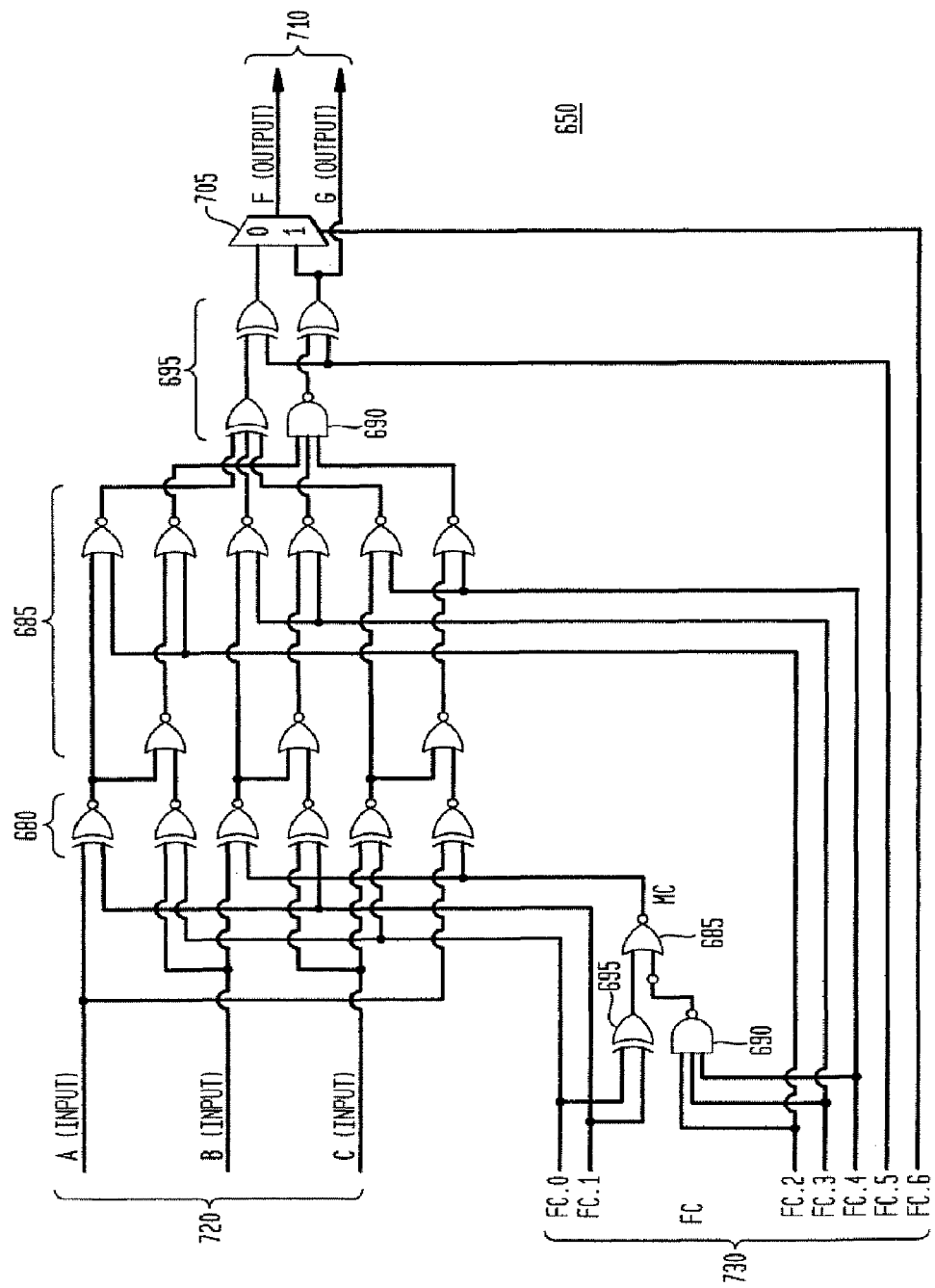
FIG. 10 is a block diagram illustrating, in greater detail, a preferred fixed computational element of a core cell of an adaptive logic processor computational unit, in accordance with the present invention.

FIG. 10 is a block diagram illustrating, in greater detail, a preferred fixed computational element 650 of a core cell 610 of an adaptive logic processor computational unit 600, in accordance with the present invention. The fixed computational element 650 is comprised of a fixed layout of pluralities of exclusive NOR (XNOR) gates 680, NOR gates 685, NAND gates 690, and exclusive OR (XOR) gates 695, with three inputs 720 and two outputs 710. Configuration and interconnection is provided through MUX 705 and interconnect inputs 730.

As may be apparent from the discussion above, this use of a plurality of fixed, heterogeneous computational elements (250), which may be configured and reconfigured to form heterogeneous computation units (200), which further may be configured and reconfigured to form heterogeneous matrices 150, through the varying levels of interconnect (110, 210, 240 and 220), creates an entirely new class or category of integrated circuit, which may be referred to interchangeably as an adaptive computing architecture or adaptive computing engine. It should be noted that the adaptive computing architecture of the present invention cannot be adequately characterized, from a conceptual or from a nomenclature point of view, within the rubric or categories of FPGAs, ASICs or processors. For example, the non-FPGA character of the adaptive computing architecture is immediately apparent because the adaptive computing architecture does not comprise either an array of identical logical units, or more simply, a repeating array of any kind. Also for example, the non-ASIC character of the adaptive computing architecture is immediately apparent because the adaptive computing architecture is not application specific, but provides multiple modes of functionality and is reconfigurable, preferably in real-time. Continuing with the example, the non-processor character of the adaptive computing architecture is immediately apparent because the adaptive computing architecture becomes configured, to directly operate upon data, rather than focusing upon executing instructions with data manipulation occurring as a byproduct.

Referring again to FIGS. 1 and 2, the various systems and methodology of the present invention may now be viewed in context of the ACE 100 architecture, based upon configuration and/or reconfiguration of fixed computational elements 250 in response to one or more sets of configuration information. Without the "something more" of configuration information, an ACE 100 is essentially or effectively an empty or "blank" device. Configuration information is necessary to generate the configurations creating one or more operating modes for the ACE 100, in order to provide a desired functionality and operate upon corresponding data, such as wireless communication, radio reception, or MP3 music playing.

Such configuration and reconfiguration may occur in a wide variety of ways. For example, an entire ACE 100 may be configured in advance of any particular use, such as preconfigured as a mobile communication device. In other embodiments, an ACE 100 may be configured to have an operating system, to power on (boot), and obtain and load other configurations for particular operating modes and functions, such as through a network 40. An ACE 100 may also be partially configured, with some matrices 150 configured and operating, while other matrices 150 are being configured for other functions.

Such an operating system in the ACE 100 may provide for a variety of automatic functions. For example, such an OS may provide for auto-routing, inserting routing fields and routing information, with configuration information, into data streams, to internally create a silverware module. Operating systems may also provide means to self-configure or self-modify, for example, using neural network and other self-learning technologies. Other operating system functions include authorization, security, hardware capability determinations, and other functions, as discussed below.

As mentioned above, such configuration information may be interleaved with data to form silverware (or a silverware module), such as executable module 70. In addition, such configuration information may also be separate from any data (effectively distributing a module 70 across time). For example, a first set of configuration information may be provided to an ACE 100 for a first operating mode, such as for mobile communications. Data may be subsequently provided separately, such as voice data, during any given communication session. The various controller 120 functions of the ACE 100 then interleave the appropriate subsets of configuration information with corresponding data, routing, configuration references, loop instructions, and power control, to provide silverware modules to the matrices 150. As mentioned above, such controller functions may be distributed within the various matrices 150, or may be embedded within the configuration information itself.

Referring to FIG. 2, an ACE 100 may obtain configuration information or entire silverware modules (70) from a plurality of sources. As illustrated in FIG. 2, configuration information or one or more complete modules 70 may be provided to an ACE 100 through a download, from a server 54, WAN 42, LAN 41, or adjunct network entity 50, via a network 40 (with any applicable intervening switches 56 and 52 and base stations 25) or via a router 53, for example. The download may be either wireline (e.g. twisted pair, optical fiber, coaxial cable, hybrid fiber-coax) or wireless, such as through a transceiver of a base station 25 or satellite (not illustrated) or wireless LAN 43. The configuration information or one or more complete modules 70 may also be provided to an ACE 100 through other media, such as a flash memory 10, a silverware storage medium 15, a computer or other machine-readable medium 20, PCMCIA cards, PDA modules, or other memory cards, for example. This configuration information or one or more complete modules 70, in the preferred ACE 100 embodiment, is stored in memory 140, distributed memory within the various matrices 150, or in the system 60 (SOC) embodiment, may also be stored in memory 61. Configuration information may also simply be stored as an actual configuration of the matrices 150, with the MIN 110 effectively functioning as memory. The configuration information may also be transient, distributed and received in real-time for a particular application or for a singular use. Other equivalent provisioning and storage means will be apparent to those of skill in the art. (An ACE 100 receiving configuration information or one or more complete modules 70, through a download or other medium, is generally referred to herein as a "receiving" ACE.)

In addition, a need or request for such configuration information may also arise from a plurality of sources, including a system user, an element of infrastructure, an ACE 100, another device including an ACE 100, or an independent device. For example, a system user may request a download of new configuration information to upgrade a device to a new standard, or may purchase a memory module (such as flash 10 or silverware storage medium 15) containing new configuration information or one or more complete modules 70 for playing additional, copyrighted MP3 music. Infrastructure elements may also initiate downloads of new configurations, either transmitted to an individual ACE 100 device (a single user, with a one-to-one (1:1) correspondence of provider and receiver) or broadcast to many ACE 100 devices (multiple users, with a one-to-many (1:many) correspondence of provider and receivers), to provide system upgrades, to adapt to new standards, or to provide other, real-time performance enhancements.

Another novel element of the present invention concerns a configuration or reconfiguration request generated by an ACE 100 itself (or another device including an ACE 100) providing, among other things, mechanisms for self-modification and self-configuration. For example, an ACE 100 (in a mobile station 30 or 32) typically having a first, CDMA configuration for use in the United States may be powered on in Europe; in the absence of standard CDMA signaling, the ACE 100 may request a wireless download of a second set of configuration information applicable to its current location, enabling the ACE 100 to have a GSM configuration for use in Europe.

As indicated above, configuration information is generally plural, consisting of a plurality of subsets of configuration information, such as first configuration information, second configuration information, through $n^{th}$ configuration information. One "set" of configuration information may be considered to correspond to a particular operating mode of the ACE 100. For example, a first set of configuration information may provide a CDMA operating mode, while a second set of configuration information may provide a GSM operating mode.

Also as indicated above, for a given or selected higher-level operating mode of an ACE 100 (or, equivalently, for a given or selected set of configuration information), the various fixed, heterogeneous computational elements 250 are correspondingly configured and reconfigured for various lower-level or lower-order functional modes in response to the subsets of the configuration information, such as configuration for discrete cosine transformation in response to first configuration information and reconfiguration for fast Fourier transformation in response to second configuration information.

The configuration information may also have different forms. In one embodiment, configuration information may include one or more discrete packets of binary information, which may be stored in memory 140, distributively stored within the matrices 150, or directly stored as a configuration of MIN 110. Configuration information may also be embodied in a continuous form, such as a continuous stream of binary or other info nation. As directed, configuration and other control bits from the configuration information are interdigitated with data to form silverware modules, for use in real-time within an ACE 100. In another embodiment, configuration information may be provided in real-time with corresponding data, in the form of a continuous stream (continuous for the duration of the selected function). For example, configuration information for a MP3 player may be provided in real-time in a silverware stream with the data bit file for the music to be played.

Two additional features are utilized to provide this capability for an ACE 100 to be safely and effectively configured and/or reconfigured in response to configuration information. First, a concept of "unit hardware", a parameter for or measurement of ACE 100 resources or capability, is utilized to gauge the capacity for a given ACE 100 to take on a new configuration and perform the new functionality, either in light of maintaining current configurations and functions and providing performance at sufficient or adequate levels, or in light of replacing current configurations and functions altogether. For example, a first generation ACE 100 may have sufficient resources, measured as unit hardware, to configure as a CDMA mobile station and simultaneously as a personal digital assistant. An attempt to load a new configuration, for example, for an MP3 player, may be inadvisable due to insufficient system resources, such that the new configuration would cause CDMA performance to degrade below acceptable levels. Conversely, a first generation ACE 100 initially configured as a PDA may have sufficient remaining resources to load the new configuration, as greater performance degradation may be allowable for these applications. Continuing with the example, a second or third generation ACE 100 may have sufficient computational element, interconnect and other ACE 100 resources to support not only its currently existing configurations, but also such new configurations (with corresponding additional functionality), such as maintaining existing CDMA configurations while simultaneously having sufficient resources for additional GSM and MP3 configurations.

Related to this concept of unit hardware to measure reconfiguration capacity is the concept of multiple versions or libraries of configuration information or one or more complete modules 70 for the addition of new functionalities. Such multiple versions or libraries of configuration information or modules 70 are tailored to correspond to potentially differing capabilities of ACE 100 devices, particularly for application to the then current ACE architectures compared to legacy architectures. Such forward "binary compatibility" will allow a module 70, designed for a current ACE 100, to operate on any newer, future ACE. For example, a suite of different sets of configuration information may be developed to provide a particular operating mode, with differences pertaining to matters such as performance quality and the number and types of features. Each of the various sets or versions of the configuration information are generated to have system requirements corresponding to the available and varying levels of ACE 100 reconfiguration capacity. Such libraries of configuration information, having requirements levels corresponding to levels of "unit hardware", may be generated in advance of a requested download or other provision, or may be generated as needed, on a real-time basis, tailored to the particular configuration capacity of the receiving ACE 100. For example, corresponding, tailored configuration information downloads may be determined in real-time, based upon a negotiation or interactivity between the ACE 100 and the configuration provider, generating and providing configuration information suitable for a negotiated or predetermined level of performance for a given operating mode.

Also for example, configuration info cation for a particular operating mode may be available only with one version having predetermined system requirements. In that event, if the particular ACE 100 does not have the corresponding capacity to meet those requirements, the ACE 100 itself may reject or decline such a potential download.

As a consequence, prior to a configuration (and/or reconfiguration) of a particular ACE architecture for a particular operating mode, the capabilities of that ACE 100 are deter mined, to avoid a download or reception of a configuration which potentially may alter or harm pre-existing operating modes or other functionalities of the device, or to provide a more suitable download tailored for the capabilities of the particular ACE 100.

The nature of the malleable ACE 100 architecture, with different physical connections created or removed in response to configuration information, renders security for configuration and reconfiguration of paramount importance. Given that such configurations are capable of altering the operating mode of the ACE architecture, in the preferred method, system and apparatus embodiments, authorization and security measures are implemented to avoid potentially destructive or harmful configurations, such as due to viruses or other unwanted, rogue configuration information. In the preferred module 70 embodiment, such security information is included within the header field 71.

Several levels of security may be implemented to control the configurability and reconfigurability of an ACE 100. A first level of security is implemented at a level of authorization to request or receive configuration information. For example, an ACE 100 may have a unique identifier or digital signature transmitted to a server 54 during a "handshake" or other initial exchange of information (such as unit hardware information) prior to a download of configuration information. The server 54 may access a database of authorized recipients, and if the particular ACE 100 is included, the server 54 will authorize the download. Such authorization measures are important for the protection of intellectual property, such as copyrighted material, and other information which may be confidential or otherwise restricted. Another level of security may be implemented to protect against the possible download of rogue, virus or corrupted configuration information, utilizing various encryption and decryption technologies, for example.

Various forms of monitoring, tracking and other record keeping are also utilized for determining and accounting for the various configuration and content usage possibilities, and may involve numerous different network entities. For example, a particular download of a module 70 or other configuration information may be generated from more than one network entity, with one transaction for a particular download of a module 70 or other configuration information also distributed across more than one network entity. Continuing with the example, a request for a download of a module 70 (or other configuration information or silverware) may be received at a base station 25 of a wireless service provider "A". To fulfill the request, the wireless service provider "A" determines the authorization status of the requesting ACE 100 and when authorized, forwards the request to another provider, such as content provider "B", which provides requested data, such as a music bit file, using a content server 54. Also in response to the request from provider "A", a set of MP3 configuration information is simultaneously provided by configuration provider "C", using a second, different server 54 under its control, such as a configuration information server. The content (data) and configuration information are provided to silverware module provider "D", who in turn interleaves the data and configuration to form a silverware module 70, using a first adjunct network entity 50 having a silverware module application node 51. Next, an encryption provider "E" encrypts the silverware module, using a second adjunct network entity 50 having an encryption application node 51, providing the encrypted silverware module to the service provider "A" for transmission to the requesting ACE 100. Corresponding accounting and other records may be generated for each such distributed transaction, with corresponding distributions of royalties, use and license fees. Content usage may also be tracked by, for example, a content server.

The generation and provision of configuration information may also be distributed across time, in addition to distributed across space, with the various functions referred to above performed during different intervals of time. For example, one or more versions or sets of configuration information may be generated and stored during a first predetermined period of time, such as in advance of any particular use. Subsequently, such a set of configuration information may be provided during a second predetermined period of time, such as following a security and financial authorization process.

In summary, the present invention provides a method of configuration and operation or an adaptive and reconfigurable circuit, preferably utilizing an executable module comprised of a plurality of information sequences. A first information sequence (or field) provides configuration control, which may be either configuration information or a reference (such as a flag or other designation) to corresponding configuration information cached or stored in memory. A second information sequence provides operand data for use by configured computational elements. A third information sequence provides routing control, to direct the other information sequences to their appropriate locations within the matrix environment of the ACE integrated circuitry. Also in the preferred embodiment a fourth information sequence is utilized to provide power control, to clock on or off various computational elements, and a fifth information sequence may be utilized for loop or iteration control.

Also in summary, one of the preferred system embodiments provides, first, means for routing configuration information to a plurality of computational elements; second, means for configuring and reconfiguring a plurality of computational elements to form a plurality of configured computational elements for the performance of a plurality of selected functions; third, means for providing operand data to the plurality of configured computational elements; and fourth, means for controlling configuration timing to precede a receipt of corresponding operand data.

Another preferred system embodiment provides, first, means for spatially configuring and reconfiguring a plurality of computational elements to form a first plurality of configured computational elements for the performance of a first plurality of selected functions; second, means for temporally configuring and reconfiguring the plurality of computational elements to form a second plurality of configured computational elements for the performance of a second plurality of selected functions; third, means for providing data to the first and second pluralities of configured computational elements; and fourth, means for coordinating the spatial and temporal configurations of the plurality of computational elements with the provision of the data to the first and second pluralities of configured computational elements.

Also in summary, one of the system embodiments provides for configuring and operating an adaptive circuit. The system comprises a first mutable and executable information module, the module having first configuration information and second configuration information, the module further having first operand data and second operand data, the module further having a first routing sequence for routing; a plurality of heterogeneous computational elements, the plurality of heterogeneous computational elements designated by the first routing sequence of the first executable information module, a first computational element of the plurality of heterogeneous computational elements having a first fixed architecture and a second computational element of the plurality of heterogeneous computational elements having a second fixed architecture, the first fixed architecture being different than the second fixed architecture; and an interconnection network coupled to the plurality of heterogeneous computational elements, the interconnection network capable of selectively providing the module to the plurality of heterogeneous computational elements, the interconnection network further capable of configuring and providing the first operand data to the plurality of heterogeneous computational elements for a first functional mode of a plurality of functional modes in response to the first configuration information, and the interconnection network further capable of reconfiguring and providing the second operand data to the plurality of heterogeneous computational elements for a second functional mode of the plurality of functional modes in response to the second configuration information, the first functional mode being different than the second functional mode.

The first mutable and executable information module may provide a first system operating mode. A second routable and executable information module may provide a second system operating mode, and further having the first routing sequence for routing to the plurality of heterogeneous computational elements. The plurality of heterogeneous computational elements may be configured to generate a request for a second routable and executable information module, the second routable and executable information module providing a second system operating mode.

The system may further include a memory coupled to the plurality of heterogeneous computational elements and to the interconnection network, the memory capable of storing the first configuration information and the second configuration information. In addition, the first configuration information and the second configuration information may be stored in a second plurality of heterogeneous computational elements configured for a memory functional mode, stored as a configuration of the plurality of heterogeneous computational elements, stored in a machine-readable medium, transmitted through an air interface, or transmitted through a wireline interface. The first mutable and executable information module may be embodied as a plurality of discrete information data packets, or embodied as a stream of information data bits.

The first fixed architecture and the second fixed architecture may be selected from a plurality of specific architectures, with the plurality of specific architectures comprising at least two of the following corresponding functions: memory, addition, multiplication, complex multiplication, subtraction, configuration, reconfiguration, routing, control, input, output, and field programmability. The plurality of functional modes may comprise at least two of the following functional modes: linear algorithmic operations, non-linear algorithmic operations, finite state machine operations, controller operations, memory operations, and bit-level manipulations.

The system may also include a controller coupled to the plurality of heterogeneous computational elements and to the interconnection network, with the controller capable of coordinating the configuration of the plurality of heterogeneous computational elements for the first functional mode with the first operand data and further coordinating the reconfiguration of the plurality of heterogeneous computational elements for the second functional mode with the second operand data. The system may also include a second plurality of heterogeneous computational elements coupled to the interconnection network, with the second plurality of heterogeneous computational elements configured for a controller operating mode, the second plurality of heterogeneous computational elements capable of coordinating the configuration of the plurality of heterogeneous computational elements for the first functional mode with the first operand data and further coordinating the reconfiguration of the plurality of heterogeneous computational elements for the second functional mode with the second operand data.

The system may be embodied within a mobile station having a plurality of operating modes, such as a mobile telecommunication mode, a personal digital assistance mode, a multimedia reception mode, a mobile packet-based communication mode, and a paging mode. The system may be embodied within a server having a plurality of operating modes, within an adjunct network entity having a plurality of operating modes, or within an integrated circuit.

In various embodiments, the first routing sequence may be coupled to the first configuration information to provide routing of the first configuration information within the interconnection network, and the first routable and executable information module further may further comprise a second routing sequence coupled to the second configuration information to provide selective routing of the second configuration information within the interconnection network to the plurality of heterogeneous computational elements, the second routing sequence being identical to the first routing sequence. The first executable information module may also include a power control sequence to direct the interconnection network to not provide a clock signal to a selected heterogeneous computational element of the plurality of heterogeneous computational elements, and/or an iteration control sequence to direct a temporal continuation of a selected configuration of the plurality of heterogeneous computational elements. The first configuration information may be a reference to a previously stored configuration sequence.

In addition, a first portion of the plurality of heterogeneous computational elements may be operating in the first functional mode while a second portion of the plurality of heterogeneous computational elements are being configured for the second functional mode.

Also in summary, the present invention provides a routable and executable information module for operating an adaptive system, the adaptive system including a plurality of computational elements having a corresponding plurality of fixed and differing architectures, with the adaptive system further including an interconnect network responsive to configure the plurality of computational elements for a plurality of operating modes. The module comprises a plurality of information sequences; wherein a first information sequence of the plurality of information sequences provides a first configuration sequence to direct a first configuration of the plurality of computational elements; wherein a second information sequence of the plurality of information sequences provides first operand data to the first configuration of the plurality of computational elements; and wherein a third information sequence of the plurality of information sequences provides routing information for selective routing of the first information sequence and the second information sequence to the plurality of computational elements.

The first information sequence may be a configuration specification, may be a reference to a stored configuration specification. The first information sequence, the second information sequence and the third information sequence may have a discrete packet form, or a continuous stream form.

A fourth information sequence of the plurality of information sequences may provide power control for a selected computational element. A fifth information sequence of the plurality of information sequences may provide instantiation duration control for a configuration of computational elements. A sixth information sequence of the plurality of information sequences may provide security control for a configuration of computational elements.

The various embodiments include a method for adaptive configuration and operation, comprising: receiving a first routable and executable information module, the module having a first routing sequence, first configuration information and second configuration information, the module further having first operand data and second operand data; using the first routing sequence, selectively routing the first configuration information and the first operand data to a plurality of heterogeneous computational elements; in response to the first configuration information, configuring and providing the first operand data to the plurality of heterogeneous computational elements for a first functional mode of a plurality of functional modes, a first computational element of the plurality of heterogeneous computational elements having a first fixed architecture and a second computational element of the plurality of heterogeneous computational elements having a second fixed architecture, the first fixed architecture being different than the second fixed architecture; and in response to the second configuration information, reconfiguring and providing the second operand data to the plurality of heterogeneous computational elements for a second functional mode of the plurality of functional modes, the first functional mode being different than the second functional mode.

The first mutable and executable information module may provide a first operating mode. The method may also include receiving a second routable and executable information module, the second executable information module providing a second operating mode; and selectively routing the second routable and executable information module to the plurality of heterogeneous computational elements. The method may also include using a second routing sequence, selectively routing the second configuration information and the second operand data to the plurality of heterogeneous computational elements, the second routing sequence identical to the first routing sequence.

The method may also include coordinating the configuration of the plurality of heterogeneous computational elements for the first functional mode with the first operand data and coordinating the reconfiguration of the plurality of heterogeneous computational elements for the second functional mode with the second operand data.

The various embodiments include a method for adaptive configuration, comprising: transmitting a first routable and executable information module, the module having a first routing sequence, first configuration information and second configuration information, the module further having first operand data and second operand data; using the first routing sequence, selectively routing the first configuration information and the first operand data to a plurality of heterogeneous computational elements; wherein when a first executable information module is received, configuring and providing the first operand data to the plurality of heterogeneous computational elements for a first functional mode of a plurality of functional modes in response to the first configuration information, and reconfiguring and providing the second operand data to the plurality of heterogeneous computational elements for a second functional mode of the plurality of functional modes in response to the second configuration information, the first functional mode being different than the second functional mode; and wherein a first computational element of the plurality of heterogeneous computational elements has a first fixed architecture and a second computational element of the plurality of heterogeneous computational elements has a second fixed architecture, the first fixed architecture being different than the second fixed architecture.

The method may be operable within a local area network, within a wide area network, or within a wireline transmitter, for example.

The various embodiments include an adaptive integrated circuit, comprising: routable configuration information and operand data; a plurality of fixed and differing computational elements; and an interconnection network coupled to the plurality of fixed and differing computational elements, the interconnection network adapted to use a routing sequence to selectively route the configuration information and operand data to the plurality of fixed and differing computational elements, the interconnection network further adapted to configure the plurality of fixed and differing computational elements for a plurality of functional modes in response to the configuration information. The plurality of fixed and differing computational elements may be configured to identify and select the configuration information from a singular bit stream containing the operand data commingled with the configuration information. The routing sequence may be coupled to the configuration information to provide the selective routing of the configuration information.

The various embodiments include an adaptive integrated circuit, comprising: a plurality of executable information modules, a first executable information module of the plurality of executable information modules and a second executable information module of the plurality of executable information modules each having corresponding operand data and corresponding routing sequences; a plurality of reconfigurable matrices, the plurality of reconfigurable matrices including a plurality of heterogeneous computation units, each heterogeneous computation unit of the plurality of heterogeneous computation units formed from a selected configuration, of a plurality of configurations, of a plurality of fixed computational elements, the plurality of fixed computational elements including a first computational element having a first architecture and a second computational element having a second architecture, the first architecture distinct from the second architecture, the plurality of heterogeneous computation units coupled to an interconnect network and reconfigurable in response to the plurality of executable information modules; and a matrix interconnection network coupled to the plurality of reconfigurable matrices, the matrix interconnection network capable of using the corresponding routing sequences to selectively route the plurality of executable information modules among the plurality of reconfigurable matrices, the matrix interconnection network further capable of configuring the plurality of reconfigurable matrices in response to the first executable information module for a first operating mode and providing corresponding operand data to the plurality of reconfigurable matrices for the first operating mode, and capable of reconfiguring the plurality of reconfigurable matrices in response to the second executable information module for a second operating mode and providing corresponding operand data to the plurality of reconfigurable matrices for the second operating mode. A controller may be coupled to the plurality of reconfigurable matrices, the controller capable of providing the plurality of executable information modules to the reconfigurable matrices and to the matrix interconnection network.

The various embodiments include an adaptive integrated circuit, comprising: a first executable information module, the module having first configuration information and second configuration information, the module further having first operand data and second operand data; a plurality of heterogeneous computational elements, a first computational element of the plurality of heterogeneous computational elements having a first fixed architecture and a second computational element of the plurality of heterogeneous computational elements having a second fixed architecture, the first fixed architecture being different than the second fixed architecture; an interconnection network coupled to the plurality of heterogeneous computational elements, the interconnection network capable of configuring the plurality of heterogeneous computational elements for a first functional mode of a plurality of functional modes in response to the first configuration information, and capable of providing the first operand data to the plurality of heterogeneous computational elements for the first operating mode, and the interconnection network further capable of reconfiguring the plurality of heterogeneous computational elements for a second functional mode of the plurality of functional modes in response to the second configuration information, the first functional mode being different than the second functional mode, and capable of providing the second operand data to the plurality of heterogeneous computational elements for the second operating mode; wherein a first subset of the plurality of heterogeneous computational elements is configured for a controller operating mode, the controller operating mode comprising at least two of the following corresponding functions: directing configuration and reconfiguration of the plurality of heterogeneous computational elements, selecting the first configuration information and the second configuration information from the first executable information module, and coordinating the configuration and reconfiguration of the plurality of heterogeneous computational elements with respective first operand data and second operand data; and wherein a second subset of the plurality of heterogeneous computational elements is configured for a memory operating mode for storing the first configuration information and the second configuration information.

The various embodiments include an adaptive integrated circuit, comprising: a first executable information module, the module having first configuration information and second configuration information, the module further having first operand data and second operand data, the module further having a first routing sequence for routing; a plurality of heterogeneous computational elements, the plurality of heterogeneous computational elements designated by the first routing sequence of the first executable information module, a first computational element of the plurality of heterogeneous computational elements having a first fixed architecture of a plurality of fixed architectures and a second computational element of the plurality of heterogeneous computational elements having a second fixed architecture of the plurality of fixed architectures, the first fixed architecture being different than the second fixed architecture, and the plurality of fixed architectures comprising at least two of the following corresponding functions: memory, addition, multiplication, complex multiplication, subtraction, configuration, reconfiguration, control, input, output, and field programmability; and an interconnection network coupled to the plurality of heterogeneous computational elements, the interconnection network capable of selectively providing the module to the plurality of heterogeneous computational elements, the interconnection network capable of configuring the plurality of heterogeneous computational elements for a first functional mode of a plurality of functional modes in response to the first configuration information, the interconnection network further capable of reconfiguring the plurality of heterogeneous computational elements for a second functional mode of the plurality of functional modes in response to the second configuration information, the first functional mode being different than the second functional mode, and the plurality of functional modes comprising at least two of the following functional modes: linear algorithmic operations, non-linear algorithmic operations, finite state machine operations, memory operations, and bit-level manipulations, and the interconnection network further capable of respectively providing first operand data and second operand data to the plurality of heterogeneous computational elements for the first functional mode and for the second functional mode.

The various embodiments include an adaptive integrated circuit, comprising: a routable and executable information module, the module having a first routing sequence, first configuration information and second configuration information, the module further having operand data; a plurality of fixed and differing computational elements; and an interconnection network coupled to the plurality of fixed and differing computational elements, the interconnection network capable of using the first routing sequence to selectively provide the module to the plurality of fixed and differing computational elements, the interconnection network further capable of responding to the first configuration information to configure the plurality of fixed and differing computational elements to have an operating system, the operating system further capable of controlling, routing and timing configuration of the plurality of fixed and differing computational elements for a plurality of functional modes in response to the second configuration information, the plurality of functional modes capable of utilizing the operand data.

Numerous advantages of the various embodiments of the present invention are readily apparent. The present invention provides an apparatus, method and system for configuration and operation of adaptive integrated circuitry, to provide one or more operating modes or other functionality of ACE circuitry and other devices incorporating ACE technology. The apparatus, method and systems of the invention combine silverware modules or other configuration information with an ACE circuit (or ACE IC), for the provision of a selected operating mode. In addition, the various embodiments of the present invention provide coordination of configuration with data reception and provide independent control of power usage for different portions of the IC.

Yet additional advantages of the present invention may be further apparent to those of skill in the art. The ACE 100 architecture of the present invention effectively and efficiently combines and maximizes the various advantages of processors, ASICs and FPGAs, while minimizing potential disadvantages. The ACE 100 includes the concepts or ideals of the programming flexibility of a processor, the post-fabrication flexibility of FPGAs, and the high speed and high utilization factors of an ASIC, with additional features of low power consumption and low cost. The ACE 100 is readily reconfigurable, in real-time, and is capable of having corresponding, multiple modes of operation. In addition, through the selection of particular functions for reconfigurable acceleration, the ACE 100 minimizes power consumption and is suitable for low power applications, such as for use in handheld and other battery-powered devices.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

The invention claimed is:

1. A system for configuring and operating an adaptive circuit, the system comprising:
 a first routable and executable information module, the first module having first configuration information and having a first routing sequence for routing the configuration information and operand data related to a first functional mode;
 a plurality of heterogeneous computational units including a digital signal processing unit, each of the plurality of heterogeneous computational units including a plurality of computational elements, a subset of the plurality of computational elements of one or more of the plurality of heterogeneous computational units designated by the first routing sequence, wherein the first module is in a format readable by each of the plurality of heterogeneous computational units, the format including a header field having an address associated with the adaptive circuit, a routing field including at least a part of the first routing sequence, and a configuration information field including at least a part of the first configuration information;
 an interconnection network coupled to the plurality of heterogeneous computational units, the interconnection network adapted to selectively provide the first module to the plurality of heterogeneous computational units, the interconnection network further adapted to change interconnections between the subset of the plurality of computational elements for the first functional mode in response to the first configuration information, wherein the first module is separated into at least two packets for provision to the plurality of heterogeneous computational units through the interconnection network; and
 a memory coupled to the interconnection network, the memory adapted to store the first configuration information in a memory location, the first module including a flag to the memory location.

2. The system of claim 1, wherein the first module coordinates the configuration of the subset of the plurality of computational elements for the first functional mode with operand data.

3. The system of claim 1, wherein the first module further comprises: an iteration control sequence to direct a temporal continuation of a selected configuration of the subset of the plurality of computational elements.

4. The system of claim 1, wherein the system is embodied within a mobile device having a plurality of operating modes including: a mobile telecommunication mode, a personal digital assistance mode, a multimedia reception mode, a mobile packet-based communication mode, and a paging mode.

5. The system of claim 1, wherein the plurality of computational elements of the digital signal processing unit each perform a function from the group of multiplication, addition, subtraction, accumulation, summation and dynamic shift.

6. The system of claim 1, wherein the first functional mode is one of fixed point arithmetic functions, floating point arithmetic functions, filtering functions, and transformation functions.

7. The system of claim 1, wherein the plurality of computational elements of the digital signal processing unit perform word level manipulation.

8. A routable and executable information module stored in a non-transitory, machine-readable medium for operating an adaptive system, the adaptive system including a plurality of heterogeneous computational units including a digital signal processing unit, the computational units each having differing computing architectures including a plurality of interconnected computational elements and an interconnection network responsive to configure interconnections between the plurality of computational elements for a plurality of operating modes, wherein the information module is in a format readable by each of the plurality of heterogeneous computational units, the format including a header field having an address associated with the adaptive system, a routing field including at least a part of the first routing sequence, and a configuration information field including at least a part of the first configuration information, the information module comprising:
 a configuration sequence to direct a first configuration of the interconnections between the plurality of computational elements to perform a first operating mode, the interconnections being changed between at least some of the plurality of computational elements and computational units in response to the first configuration of interconnections, wherein the information module is separated into at least two packets for provision to the plurality of heterogeneous computational units through the interconnection network;

a routing sequence to route information for selective routing of the configuration sequence to the interconnections between the plurality of computational elements; and an iteration control sequence to direct a temporal continuation of the first configuration of the plurality of computational elements.

9. The information module of claim 8, wherein the computational elements of the digital signal processing unit each perform a function from the group of multiplication, addition, subtraction, accumulation, summation and dynamic shift.

10. The information module of claim 8, wherein the configuration sequence directs the configuration of the digital signal processing unit to perform a function including one of fixed point arithmetic functions, floating point arithmetic functions, filtering functions, and transformation functions.

11. The information module of claim 8, wherein the configuration sequence directs one of the computational units to perform a bit level manipulation computational function and directs the digital signal processing unit to perform word level manipulation.

12. The information module of claim 8, wherein the plurality of heterogeneous computational units includes a simple computational unit having a plurality computational elements including a function generator and an adder, a register and an adder, a function generator and a register, or a function generator and an adder and a register, the function generator having data inputs and a control input to selection a specific function; and wherein the plurality of computational elements of the digital signal processing unit includes a multiplier and an adder, a multiplier and a register, or a multiplier and an adder and a register.

13. A method of configuring and operating an adaptive circuit including a plurality of heterogeneous computational units including a digital signal processing unit, each of the plurality of heterogeneous computational units including a plurality of computational elements and an interconnection network coupled to the plurality of heterogeneous computational units, the method comprising:

creating a first routable and executable information module having first configuration information and having a format readable by each of the plurality of heterogeneous computational units, the format including a header field having an address associated with the adaptive circuit, a routing field, a configuration information field including at least a part of a first configuration information, a first routing sequence for routing the configuration information, the first routing sequence stored at least partly in the routing field, and operand data related to a first functional mode;

designating a subset of the plurality of computational elements of one or more of the plurality of heterogeneous computational units by the first routing sequence;

adapting the interconnection network to selectively provide the first module to the plurality of heterogeneous computational units in at least two packets;

changing interconnections of the interconnection network between the subset of the plurality of computational elements for the first functional mode in response to the first configuration information; and storing the first configuration information in a memory location of a memory coupled to the interconnection network, the first module including a flag to the memory location.

14. The method of claim 13, wherein the computational elements of the digital signal processing unit each perform a function from the group of multiplication, addition, subtraction, accumulation, summation and dynamic shift.

15. The method of claim 13, wherein the configuration sequence directs the configuration of the digital signal processing unit to perform a function including one of fixed point arithmetic functions, floating point arithmetic functions, filtering functions, and transformation functions.

16. The method of claim 13, wherein the configuration sequence directs one of the computational units to perform a bit level manipulation computational function and directs the digital signal processing unit to perform word level manipulation.

17. The method of claim 13, wherein the plurality of heterogeneous computational units includes a simple computational unit having a plurality computational elements including a function generator and an adder, a register and an adder, a function generator and a register, or a function generator and an adder and a register, the function generator having data inputs and a control input to selection a specific function; and wherein the plurality of computational elements of the digital signal processing unit includes a multiplier and an adder, a multiplier and a register, or a multiplier and an adder and a register.

* * * * *